(12) United States Patent
Levy et al.

(10) Patent No.: US 10,966,409 B2
(45) Date of Patent: Apr. 6, 2021

(54) PETFOOD PREPARATION APPARATUS WITH FOOD IDENTIFICATION SYSTEM

(71) Applicant: The Full Life Company, Phoenix, AZ (US)

(72) Inventors: William Levy, Phoenix, AZ (US); Scott Eller, Phoenix, AZ (US)

(*) Notice: Subject to any disclaimer, the term of this patent is extended or adjusted under 35 U.S.C. 154(b) by 0 days.

(21) Appl. No.: 16/909,967

(22) Filed: Jun. 23, 2020

(65) Prior Publication Data

US 2020/0315135 A1 Oct. 8, 2020

Related U.S. Application Data

(63) Continuation-in-part of application No. 16/175,145, filed on Oct. 30, 2018.

(60) Provisional application No. 62/865,599, filed on Jun. 24, 2019.

(51) Int. Cl.
*A01K 5/01* (2006.01)
*A47J 27/04* (2006.01)
*A01K 5/02* (2006.01)

(52) U.S. Cl.
CPC ............. *A01K 5/0114* (2013.01); *A47J 27/04* (2013.01); *A01K 5/02* (2013.01)

(58) Field of Classification Search
CPC ......... A01K 5/0114; A01K 5/02; A47J 27/04; A47J 31/407; A23L 1/0121; A23L 1/296; A23F 5/36; B65D 85/816

USPC ....... 99/487, 289 R, 295, 302 R, 323.2, 280; 426/77, 78, 80, 394, 112, 86

See application file for complete search history.

(56) References Cited

U.S. PATENT DOCUMENTS

| | | | | |
|---|---|---|---|---|
| 5,207,148 A | * | 5/1993 | Anderson | A47J 31/52 99/281 |
| 6,192,895 B1 | * | 2/2001 | Yuhara | A45C 13/008 132/294 |
| 8,857,317 B2 | * | 10/2014 | Manser | A23L 33/40 99/289 R |
| 9,980,602 B2 | * | 5/2018 | Hanes | A47J 31/32 |
| 2016/0220058 A1 | * | 8/2016 | Rocklinger | A23L 5/13 |

* cited by examiner

*Primary Examiner* — Phuong T Nguyen
*Assistant Examiner* — Yeong Juen Thong
(74) *Attorney, Agent, or Firm* — Frank Marino

(57) ABSTRACT

An apparatus for preparing pet food has a base and a lid. The base is engageable with a container of the pet food and the lid is moveable relative to the base between an open state for allowing engagement and disengagement of the container and a closed state for preventing disengagement. The apparatus includes a scanner for reading a pet food identifier on the container. The scanner is adapted to read the pet food identifier and provide it to a controller. The controller is adapted to obtain food preparation parameters from an external database and to cause the apparatus to then prepare the pet food according thereto.

14 Claims, 24 Drawing Sheets

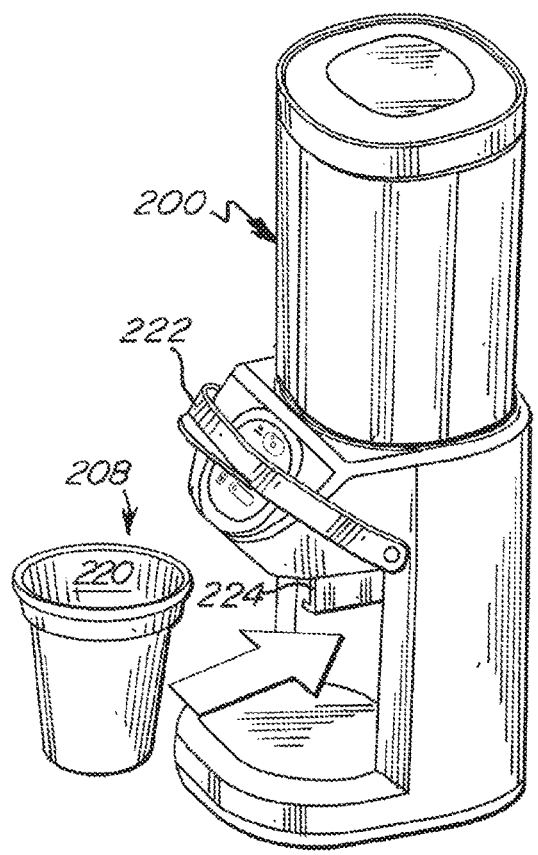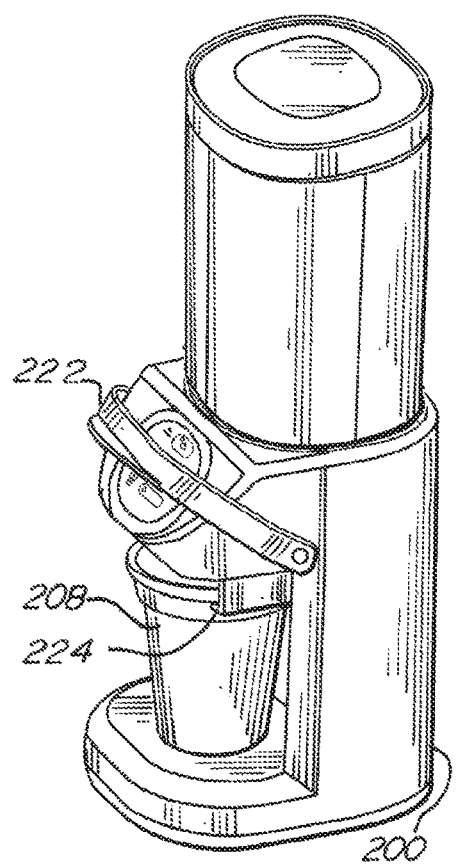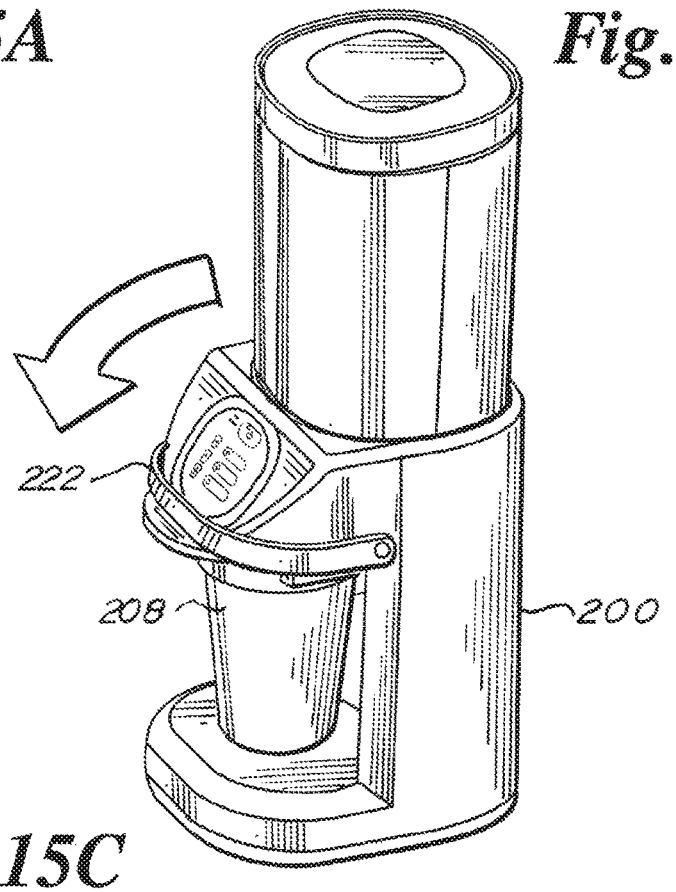
Fig.15A
Fig.15B
Fig.15C

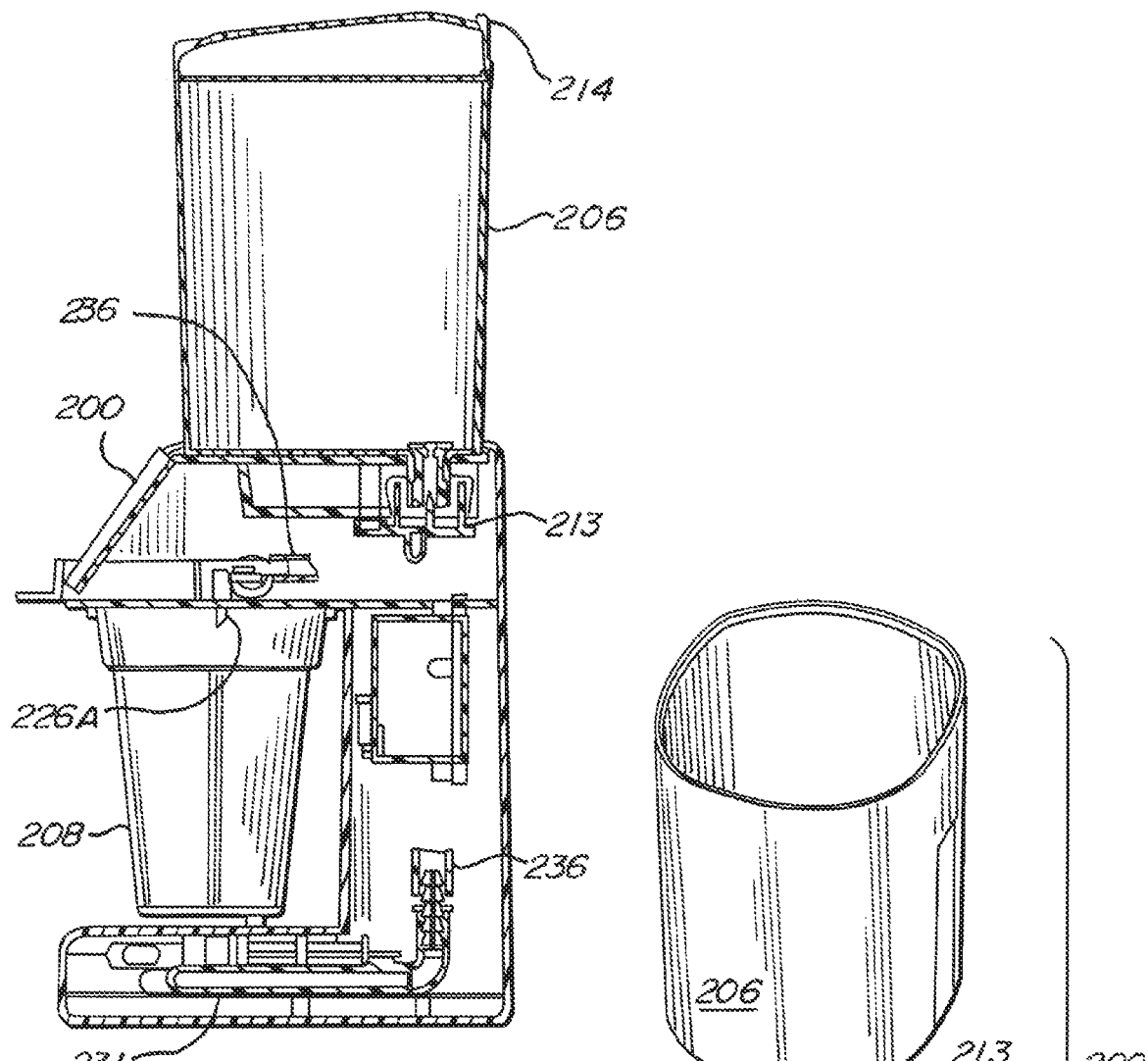
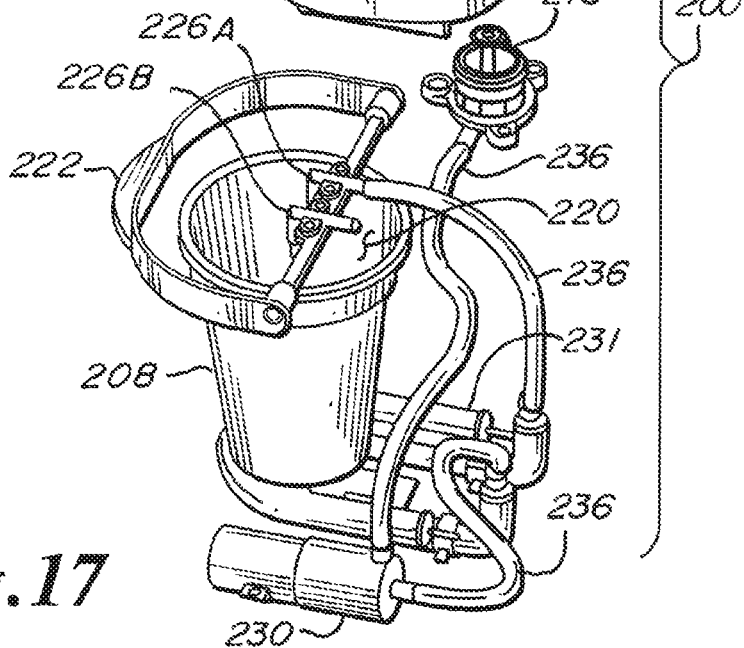

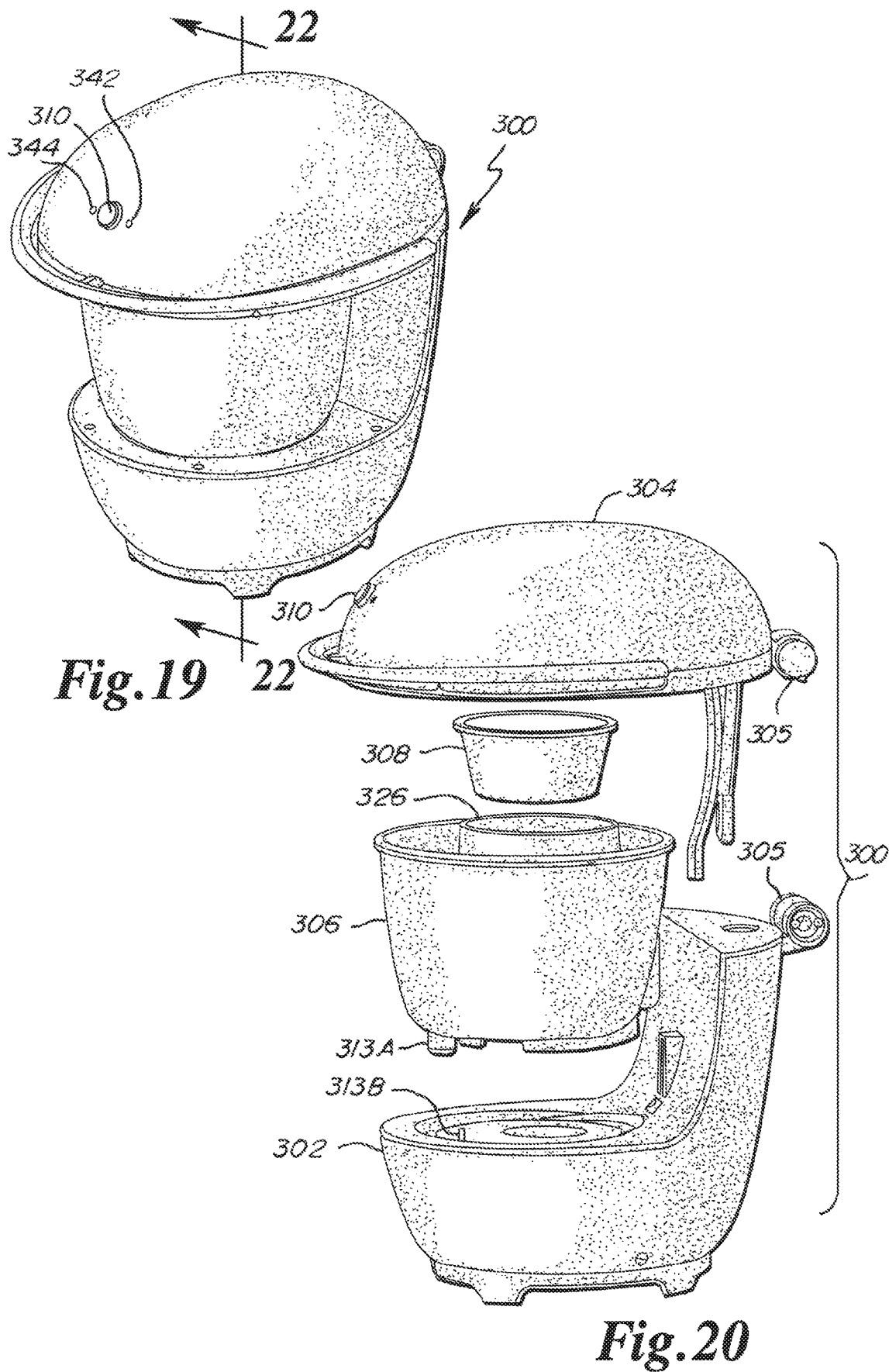

PETFOOD PREPARATION APPARATUS WITH FOOD IDENTIFICATION SYSTEM

FIELD

The present invention is related to pet feeding. More specifically, the invention is related to a device for preparing warm and moist meals to pets and to means by which the device can automatically recognize the food to be prepared and adjust its preparation according thereto.

BACKGROUND

A common and age-old problem is that pets, especially dogs, love warm moist meals. And we, feeling that our pets are like our children, love to pamper them. Our pets love what we eat, and we love to feed them what they love. Much of that might be because they see us eating moist warm aromatic meals, and they wish to emulate us, but then we serve them dry pebbly things that, while probably healthy enough for them, are nothing like what we are serving ourselves. While we sometimes serve them moist food from cans, it is just not the same as what we are eating, and they know the difference. And fresh food made from wholesome human-quality ingredients is always healthier than whatever is in those cans and bags, and we know the difference. If dogs are truly "man's best friend", then they deserve to be treated as such and to eat the way we do . . . warm moist healthful meals that smell and taste fresh and delicious. And the same applies to cats and other cherished pets.

Efforts have been made to satisfy our desire to pamper our pets with warm meals by the marketing of pet food with instructions to add hot water, stir, and serve. But such products have proven to require too much effort and time and have therefore failed to take hold in the marketplace. Some pet owners take it upon themselves to add water to dry pet food and warm it in a microwave, or to spoon canned pet food into a bowl and warm it in a microwave, but few pet owners are devoted enough to go to so much effort, and frankly, warmed pet food smells terrible, and accentuates the poor quality of and lack of freshness in its ingredients. Anyone who has smelled canned dog food hot out of the microwave knows how unappealing it is. And anyone who has gone to the trouble of heating their pets' meals on a stove or in a microwave knows that is takes on average fifteen minutes, and that those seem like the longest fifteen minutes of the day, as their pets wait patiently, drooling profusely, nearby.

There is the need, and it may be an objective of the invention, to provide a simple appliance that creates warm moist fresh and healthful meals for pets. There is the additional need, and it may be an additional objective of the invention, to create such warm moist fresh and healthful meals for pets quickly. There is the additional need, and it may be an additional objective of the invention, to provide a simple system for creating such quick warm moist fresh and healthful meals for pets. There is the additional need, and it may be an additional objective of the invention to provide a simple method for creating such quick warm moist fresh and healthful meals for pets. There is the additional need, and it may be an additional objective of the invention, to provide a simple method for creating such quick warm moist fresh and healthful meals for pets using a simple appliance and/or system. There is the additional need, and it may be an additional objective of the invention to provide an appliance, system and/or method wherein the food is prepared optimally and differently according to its ingredients. There is the additional need, and it may be an additional objective of the invention to provide an appliance, system and/or method wherein the ingredients are automatically recognized, and the food is automatically prepared optimally and differently according thereto. There is the additional need, and it may be an additional objective of the invention to provide an appliance, which automatically recognizes the ingredients of a pet food and automatically prepares the pet food optimally and differently according to those ingredients. Further needs and objectives will become apparent upon perusal of the disclosure herein.

SUMMARY

The herein disclosed exemplary appliances, and equivalents thereto, combine cool or warm water, and sometimes steam, with specially suited pet food, including the stirring thereof when needed, to provide a warm moist fresh healthful delicious and aromatic meal for a pet, which emulates the types of meals the pet's master serves himself or herself. The herein disclosed exemplary appliances include means for scanning the package in which the pet food is supplied to determine its ingredients, including the quantity and type thereof, and to automatically adjust the process by which the food is moistened, warmed, and stirred according thereto.

The invention may be embodied by or practiced using an apparatus engageable with a container of pet food for preparing the pet food and comprising a water source, a water pump, and a water heater. The container may include a code which is unique to the contents of the container and the apparatus may include means for reading the code and altering its functions according to a program associated with the code to ensure that the preparation is optimized according to the unique contents.

The water pump may cause a first amount of water to flow to the heater where the first amount is heated and then may cause the heated first amount to flow and be stirred into the pet food whereby the pet food is heated to a first temperature and moistened to a first moistness level. A timer may provide a first steeping period after the first amount has flowed into the pet food. The water pump may cause a second amount of water to flow to the heater after the first steeping period. The second amount may be heated and the pump may cause the heated second amount to flow and be stirred into the pet food whereby the pet food is heated or cooled to a second temperature and moistened to a second moistness level.

The timer may provide a second steeping period after the second amount has flowed into the pet food. The apparatus may include a ready indicator, wherein the ready indicator may be activated after the second steeping period to indicate that the pet food is properly heated and moistened for serving. The water source may be a refillable water tank.

The apparatus may include a piercer for piercing the container to allow access to the food therein. The apparatus may include a user accessible lever for activating the piercer. The piercer may be a spout in communication with the water pump and adapted to both pierce the container and enable the first and second amounts to flow there-through and into the pet food.

The amounts, temperatures, and steeping periods may be altered by the apparatus according to pre-programmed data, or data retrieved from a website such as by direct or wireless connection of the apparatus to the Internet, or data retrieved by wireless communication with a remote device that is connected to the Internet, or data retrieved from a remote device on which it is stored.

The apparatus may alternatively include a controller enabling user input of a food container size or a food type. The controller may communicate with the water pump to control one or both of the first and second amounts according to the user inputted food container size. The first and second amounts may be variable by the controller according to the inputted food container size. The first temperature may be over approximately 140 F. The second temperature may be between approximately 95 F and 105 F.

The apparatus may alternatively include a motor-driven turntable, a food bowl engageable with and removable from the turntable, and a stationary stirrer. Activation of the piercer may cause the food to fall from the food container into the food bowl. The turntable may cause the food bowl to rotate and the stationary stirrer to stir the food in the rotating bowl during the first and second steeping periods. The apparatus may include a ready indicator, wherein the ready indicator may be activated after the second steeping period to indicate that the pet food is properly heated and moistened for serving.

The water source may be a refillable water tank. The apparatus may include a user accessible lever for activating the piercer. The piercer may be a blade adapted to cause a partially annular cut through the food container. The apparatus may include a controller enabling user input of food container size. The controller may communicate with the water pump to control one or both of the first and second amounts according to the user inputted food container size.

The invention may alternatively be embodied by or practiced using a method of preparing a meal for a pet. The method may include determining the contents of the food container through either manual input or by reading a code on the food's container. The method may include adding water of a first temperature to the pet food from the group including freeze dried meat, vegetable and grain, dehydrated meat, vegetable and grain, and raw meat, vegetable and grain.

The method may include steeping the food/water mixture for at least 30 seconds. The method may include adding hot water of a lesser than 140 F temperature to the steeped mixture of a temperature such that the mixture becomes 95 F to 105 F. The method may include stirring the steeping food/water mixture. The method may include stirring the less hot water and steeped food/water mixture.

The invention may alternatively be embodied by or practiced using an apparatus engageable with a container of pet food for preparing the pet food and including a water source, a water pump, a water heater, a timer, and an indicator. The water pump may cause a first amount of water to flow to the heater where the first amount is heated to over approximately 140 F and then may cause the heated first amount to flow into the pet food whereby the pet food is heated and moistened. The timer may monitor a first steeping period after the first amount has flowed into the pet food. The water pump may cause a second amount of water to flow to the heater and be heated to a second temperature. The second amount may flow into the pet food to cool and further moisten the steeped pet food. The indicator may be actuated to indicate that the pet food is properly heated and moistened for serving. The timer may then monitor a second period after the second amount has flowed into the steeped pet food and before the indicator is actuated. The second temperature may be such that the food properly heated and moistened for serving is 95 F to 105 F.

The invention may alternatively be embodied by or practiced using an apparatus engageable with a container of pet food for preparing the pet food and having a steam generation chamber, a heater, a scanner configured to read a pet food identifier on the container, a conduit for liquid communication from the steam generation chamber to the container, a fluid transfer device in fluid communication with the steam generation chamber, and a controller. The scanner may be adapted to communicate the read pet food identifier to the controller. The controller may be adapted to obtain or determine from the read pet food identifier a steam volume and a steeping time. The fluid transfer device may be adapted to selectively enable or deliver a volume of water to the steam generation chamber. The heater may be adapted to heat the volume of water in the steam generation chamber into steam. The conduit may be adapted to selectively deliver the determined steam volume from the steam generation chamber to the container. The controller may be adapted to control the heater and the fluid transfer device. And the controller may be adapted to do one or both of disable the apparatus and cause indication that the food is prepared at the end of the determined steeping time.

The controller may adapted to obtain the steam volume and the steeping time wirelessly from an external database.

The apparatus may further include a piercer adapted for piercing the container and the steam volume may be delivered to the container through the piercer.

The apparatus may have a base adapted to support the container and a lid movable relative thereto from a closed state wherein the container may not be removed from the base and an open state wherein the container may be removed from the base. The apparatus may have a latch to selectively lock the lid in the closed state. The lid may house the piercer and movement of the lid from the open state to the closed state may cause the piercer to pierce the container. The conduit may also include the piercer.

The base may house the scanner. The pet food identifier may be one from a group of authorized codes, and the apparatus may be adapted to disable the heater and the pump upon failure of the scanner to read an authorized code on the container.

The invention may alternatively be embodied by or practiced using an apparatus engageable with a container of pet food for preparing the pet food and having a steam generation chamber, a first fluid transfer device in liquid communication with the steam generation chamber, a first heater in thermal communication with the steam generation chamber, a first conduit for liquid communication from the steam generation chamber to the container, a water heating chamber, a second fluid transfer device in liquid communication with the water heating chamber, a second heater in thermal communication with the water heating chamber, a third fluid transfer device in liquid communication with the water heating chamber, a second conduit for liquid communication from the heating chamber through the third fluid transfer device to the container, a scanner configured to read a pet food identifier on the container, a controller, and a thermostat. The scanner may be adapted to communicate the read pet food identifier to the controller. The controller may be adapted to obtain or determine from the read pet food identifier a steam volume, a hot water temperature, a hot water volume, a steeping time, and a resting time. The first fluid transfer device may be adapted to selectively enable or deliver a first volume of water into the steam generation chamber, the first heater may be adapted to heat the first volume of water in the steam generation chamber into steam of the determined steam volume. The first conduit may be adapted to selectively deliver the determined steam volume from the steam generation chamber to the container. The second fluid transfer device may be adapted to selectively enable or deliver a second volume of water into the heating chamber. The second heater may be adapted to heat the second volume of water in the heating chamber to the determined hot water temperature. The third fluid transfer device may be adapted to selectively enable or deliver the determined hot water volume from the heating chamber through the second conduit to the container. The controller may be adapted to control the first and second heaters and the first, second, and third fluid transfer devices. And the controller may be adapted to do one or both of disable the apparatus and cause indication that the food is prepared at the end of the determined resting time.

The controller may be adapted to obtain the steam volume, hot water temperature, hot water volume, steeping time, and resting time wirelessly from an external database.

The apparatus may further include first and second piercers adapted for piercing the container and the steam and hot water volumes are delivered to the container through their associated piercer. The apparatus may have a base adapted to support the container and a lid movable relative thereto from a closed state wherein the container may not be removed from the base and an open state wherein the container may be removed from the base.

The apparatus may further include comprising a latch to selectively lock the lid in the closed state. The lid may house the piercers and movement of the lid from the open state to the closed state causes the piercers to pierce the container. The conduits may also include their associated piercers.

The base may house the scanner. The pet food identifier may be one from a group of authorized codes, and the apparatus may be adapted to disable the heater and the pump upon failure of the scanner to read an authorized code on the container.

The invention may alternatively be embodied by or practiced using an apparatus for preparing pet food having a base, a lid, a scanner, and a controller. The base may support a container of the pet food and the lid may be moveable relative to the base between an open state for allowing access to the container and a closed state for preventing access. The scanner may read a pet food identifier on the container and communicates that identifier to the controller; and the controller may obtain food preparation parameters from an external database and cause the apparatus to then prepare the pet food according thereto.

Further features of the invention will become apparent upon perusal of the disclosure herein.

BRIEF DESCRIPTION OF THE DRAWINGS

FIGS. 15A through 15C are a series of sequential views of the steps used to make fresh pet food using the system of FIG. 10;
FIG. 16 is a cross-sectional side view of the system of FIG. 10;
FIG. 17 is a partial exploded view of the system of FIG. 10;
FIG. 19 is a perspective view of a fresh-serve pet food system according to a third exemplary embodiment;
FIG. 20 is an exploded view of the system of FIG. 19.

DESCRIPTION OF EXEMPLARY EMBODIMENTS

Figure 1:
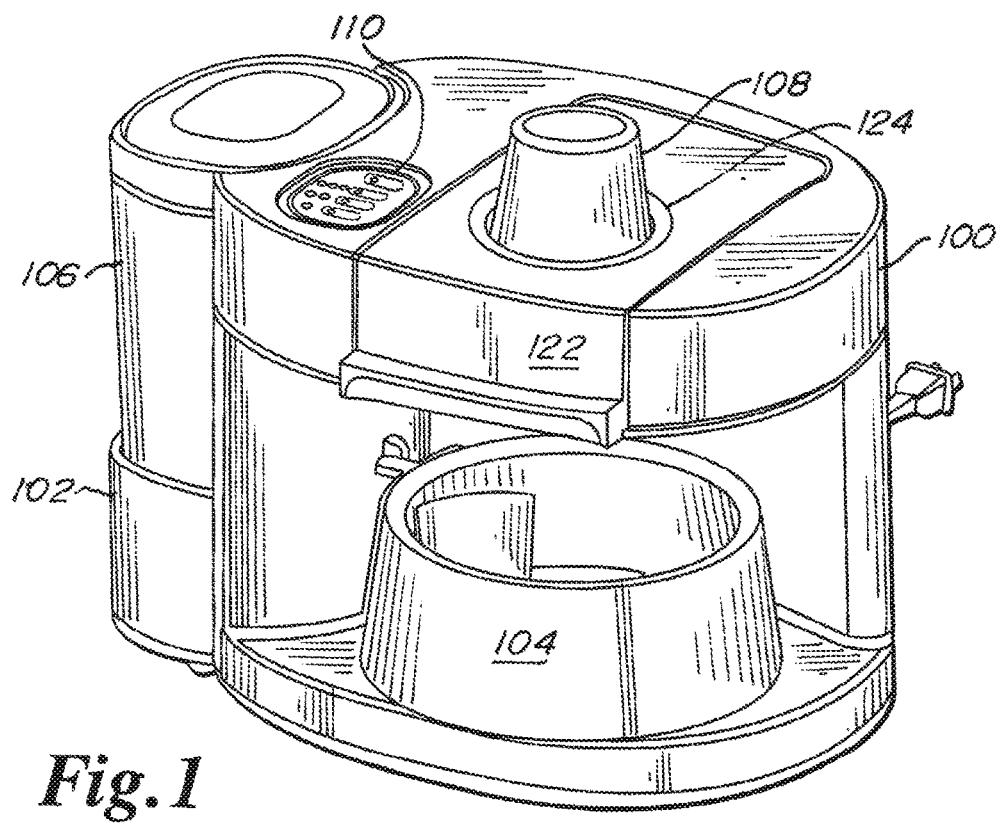
FIG. 1 is a perspective view of a fresh-serve pet food system according to a first exemplary embodiment.

Referring first to FIGS. 1 through 9, a first exemplary fresh-serve pet food maker 100 is shown. The maker has a base 102, a food bowl 104, a stirrer 128 and a water tank 106. The base is adapted to receive the water tank, the food bowl/stirrer and the food cup 108 as explained below and depicted in the figures. The base has a control panel 110 which provides a user interface for operation.

Figure 5:
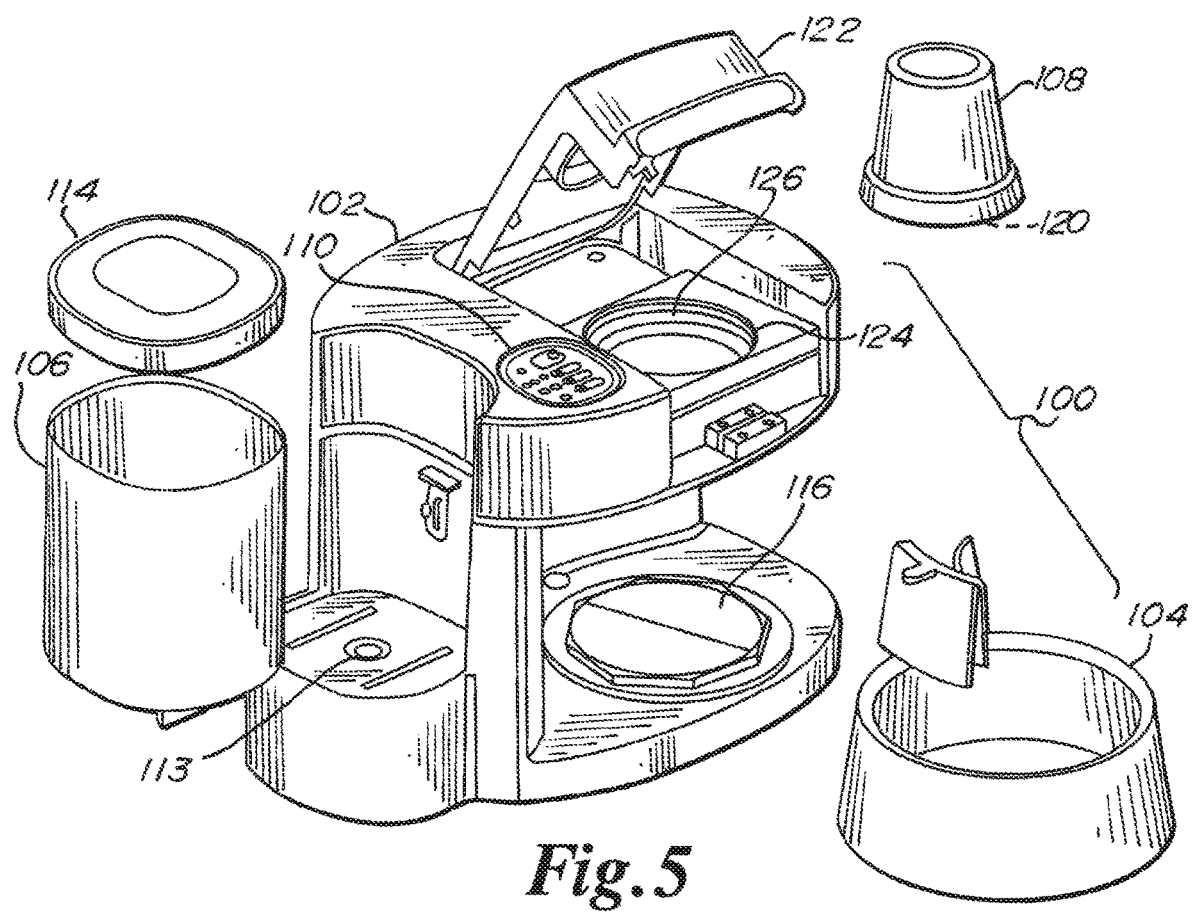
FIG. 5 is an exploded view of the system of FIG. 1.
Figure 2:
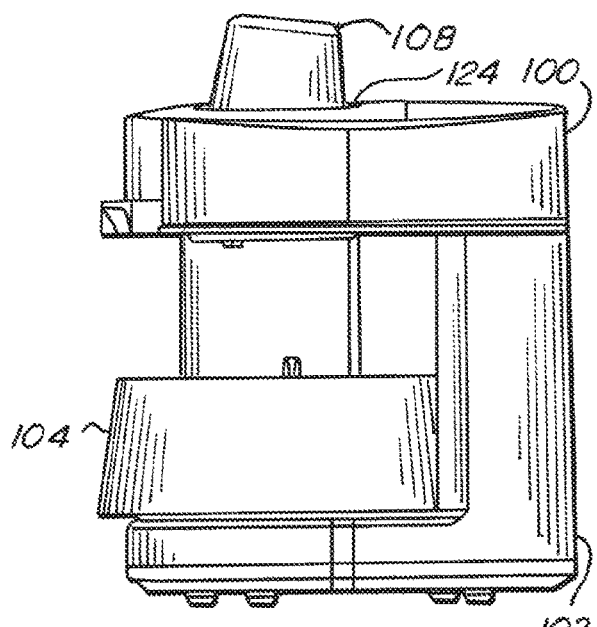
FIG. 2 is a side view of the system of FIG. 1.
Figure 3:
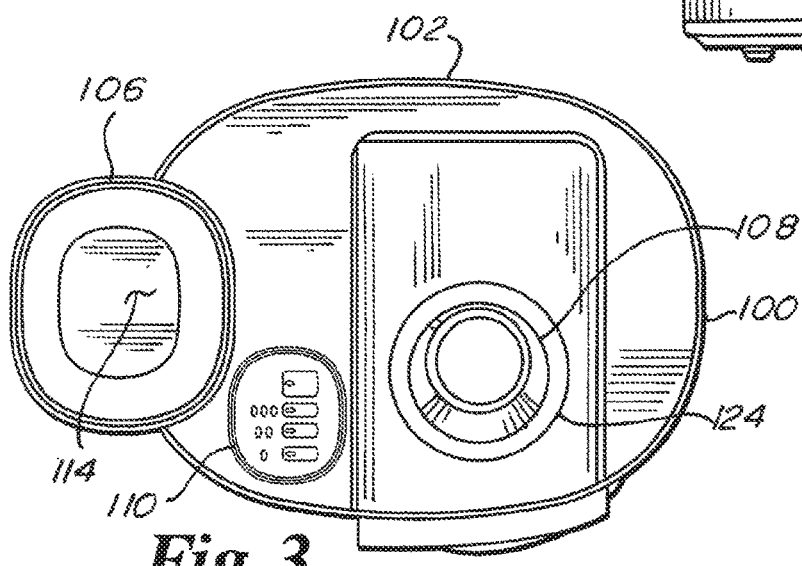
FIG. 3 is a top view of the system of FIG. 1.
Figure 4:
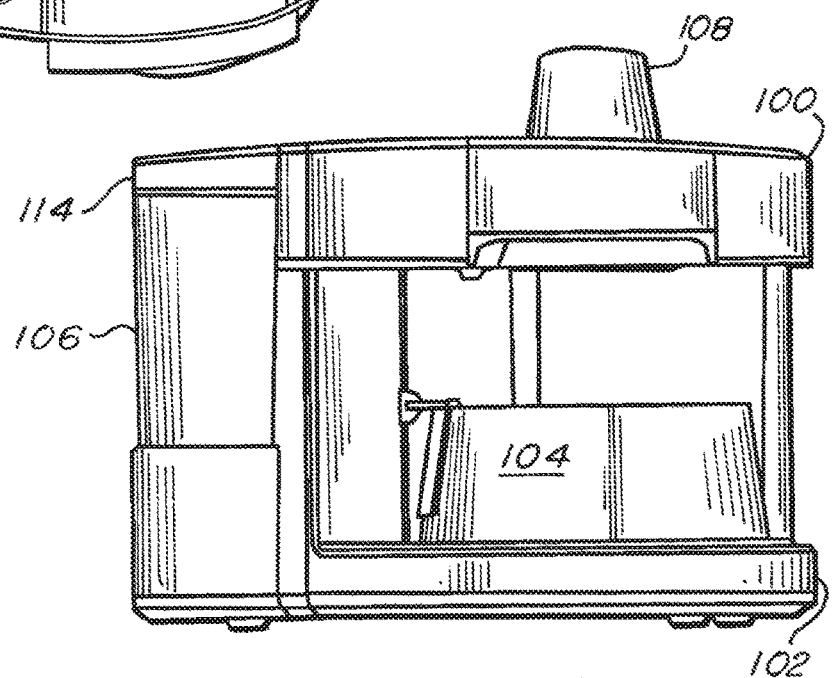
FIG. 4 is a front view of the system of FIG. 1.

Water tank 106 is initially filled with water either by removing the tank from the base and removing the tank's lid 114 as in FIG. 5, filling the tank at a tap, and returning the tank to the base, or by removing the lid and carrying the entire maker to the tap for filling, or by filling with an auxiliary pitcher or such (not shown). Food cup 108 has one of a variety of volumes according to the pet's diet and is provided filled with loose pet food 118 and sealed with a foil top 120.

The pet food is made of wholesome ingredients, including meats, grains, vegetables, and broths, all free-dried at their peak of freshness and immediately vacuum sealed into the cup. Once re-hydrated, the food is more healthful, fresh, and delicious, than any other pet food in the market. The food may otherwise be some other type, such as dehydrated pet food in need of rehydration or raw pet food in need of cooking.

Figure 6A:
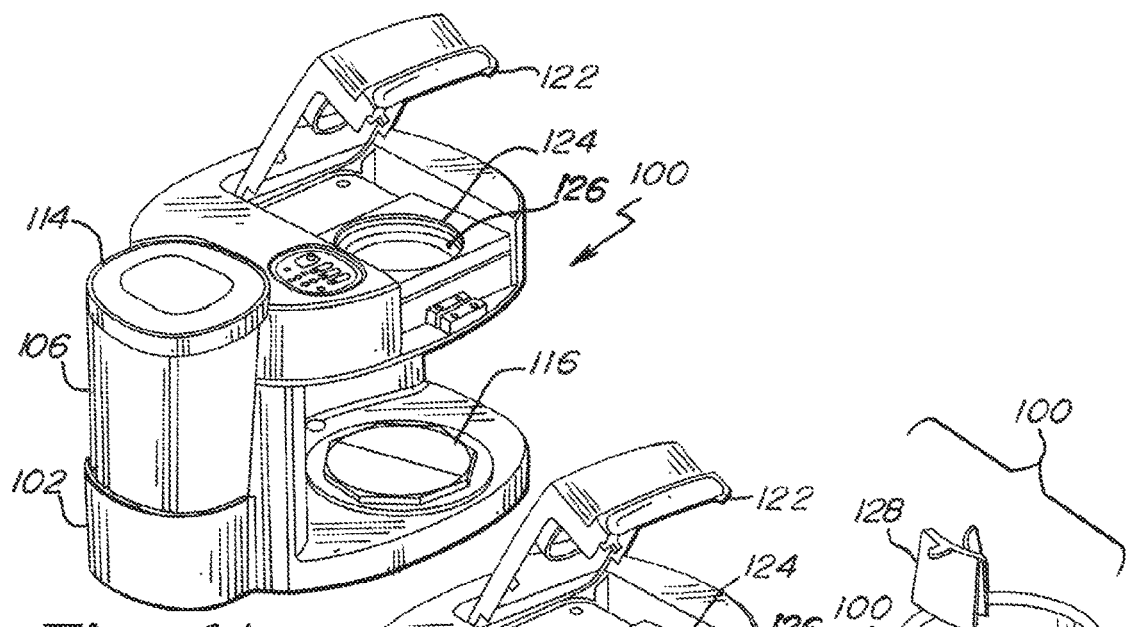
FIGS. 6A through 6E are a series of sequential views of the steps used to make fresh pet food using the system of FIG. 1.
Figure 6B:
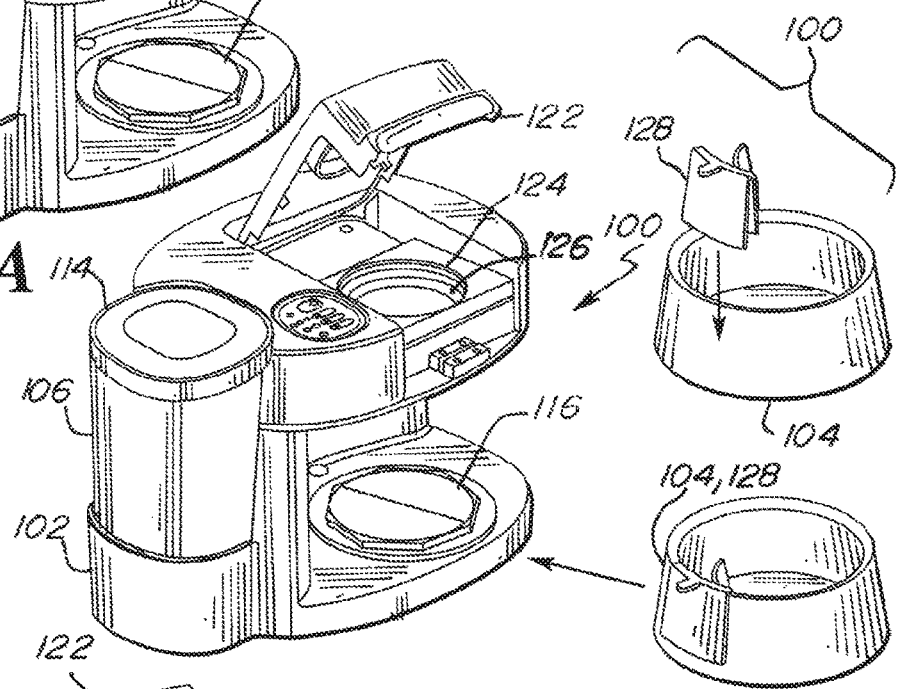
Figure 6C:
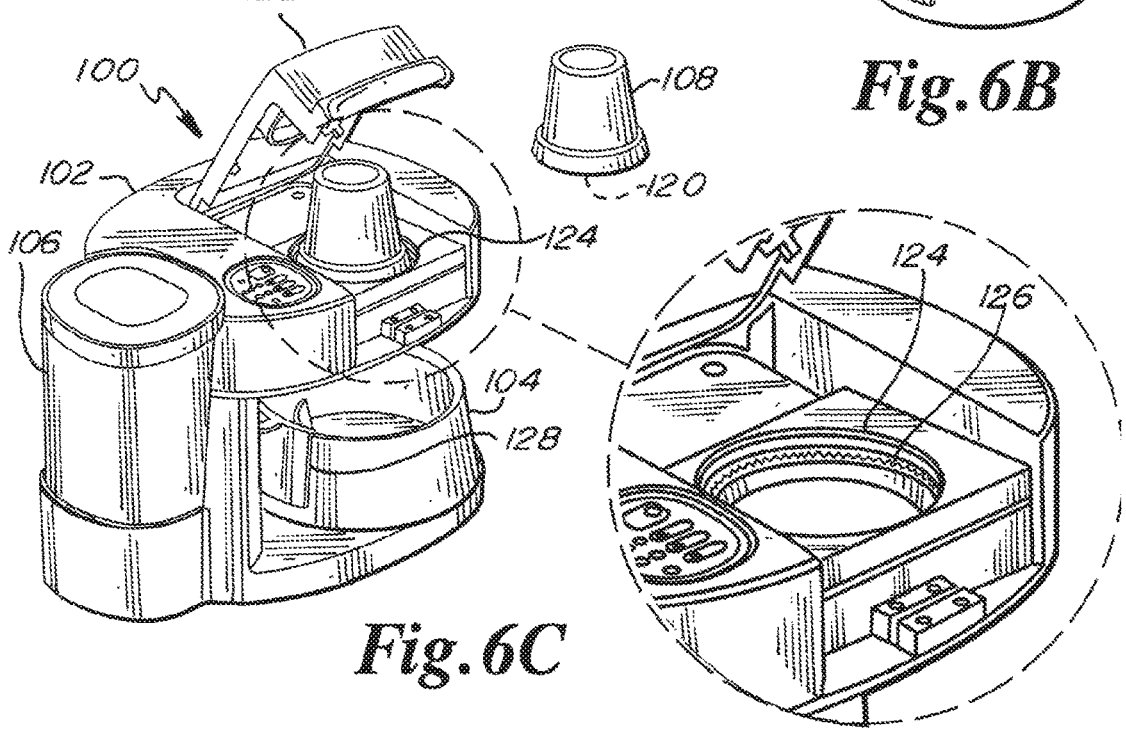
Figure 6D:
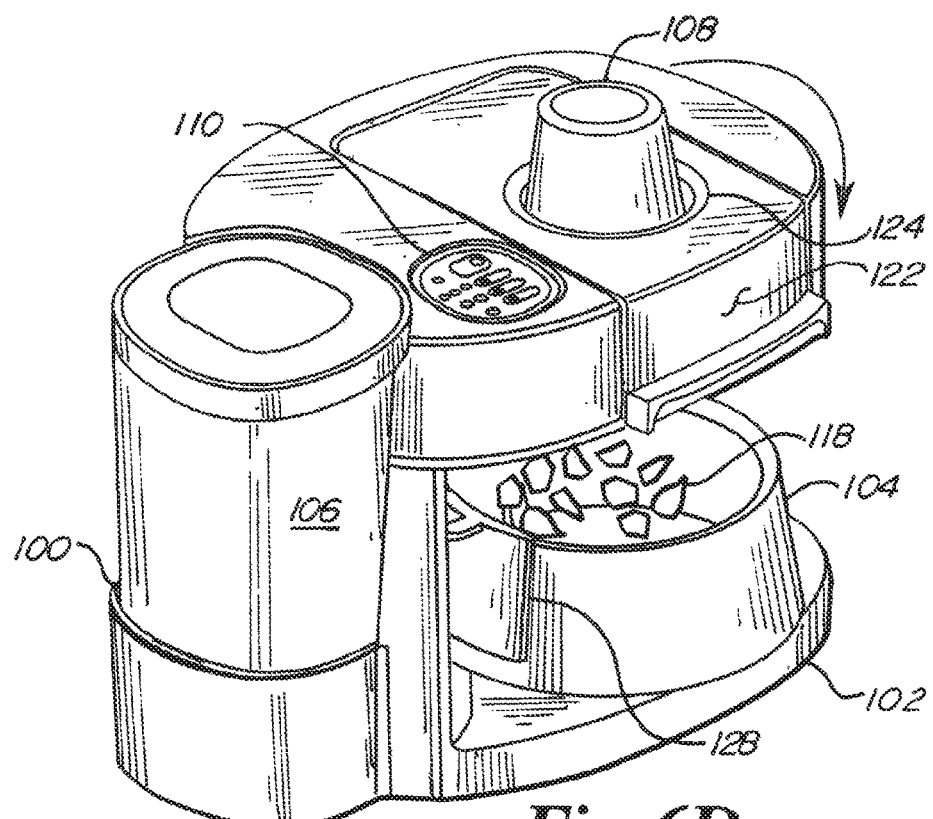

The base's lever 122 is lifted as in FIG. 6A. Stirrer 128 is placed over the peripheral lip of the food bowl and the bowl is then placed on the base's octagonal turn table 116 as in FIG. 6B. The underside of the bowl has an octagonal recess (not shown) which engages the turn table. The cup is then placed top-side-down into bottomless cup receiver 124 so that the cup receiver's annular serrated blade 126 contacts the foil top as in FIG. 6C. As lever 122 is then pushed back down as shown in FIG. 6D, it forces the serrated blade to pierce the foil top, which flaps downwardly open to release the food from the cup. The blade has a gap in its circular edge, which prevents the blade from completely severing the top form the cup, and so the top remains connected to the cup only in the small zone avoided by the gap. This allows the weight of the loose dry pet food to force down and open the top, and allows the food to fall through the open-bottomed cup receiver and into the food bowl, but retains the top attached to the cup for later discarding together . . . and prevents the top form also falling into the bowl where it otherwise could interfere with stirring and be dangerously consumed by the pet. The press plate may be lifted at any subsequent time to retrieve and discard the spent food cup.

The cups are provided in a variety of recipes and volumes so that larger amounts of food may be served to larger pets, or a plurality of smaller cups may be deposited into the bowl.

Figure 6E:
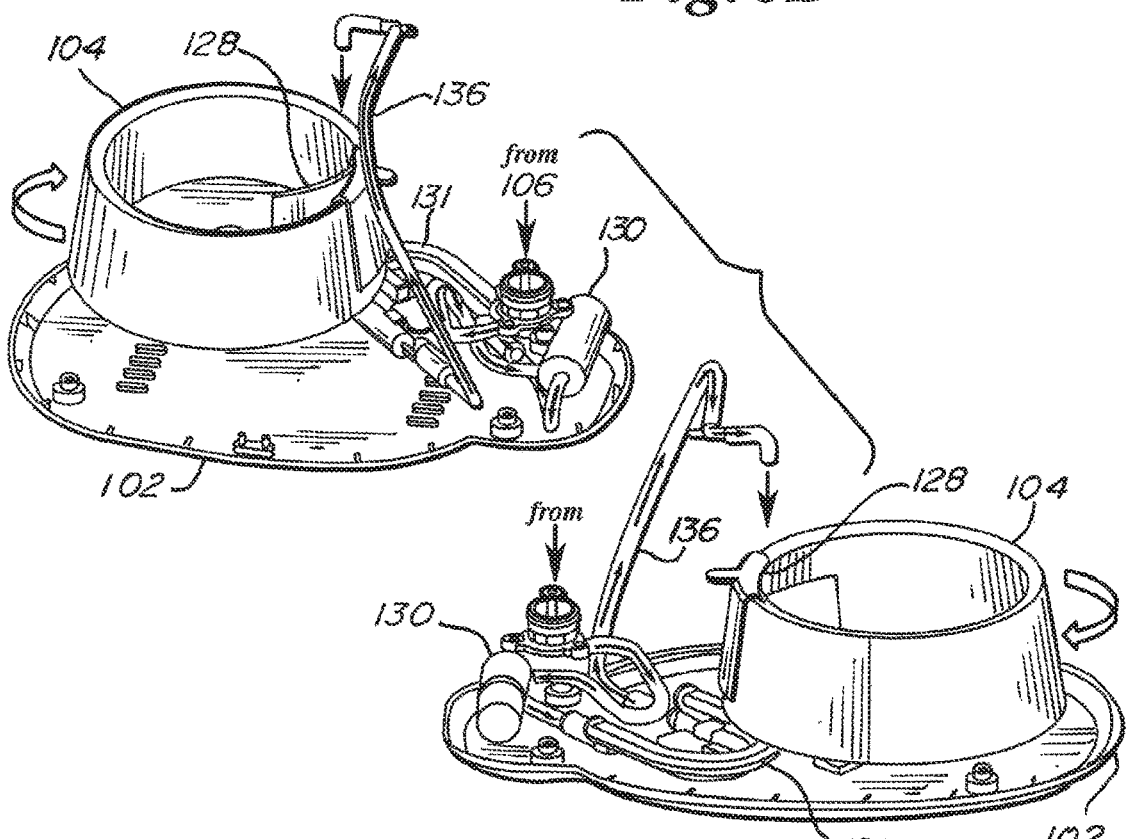
Figure 10:
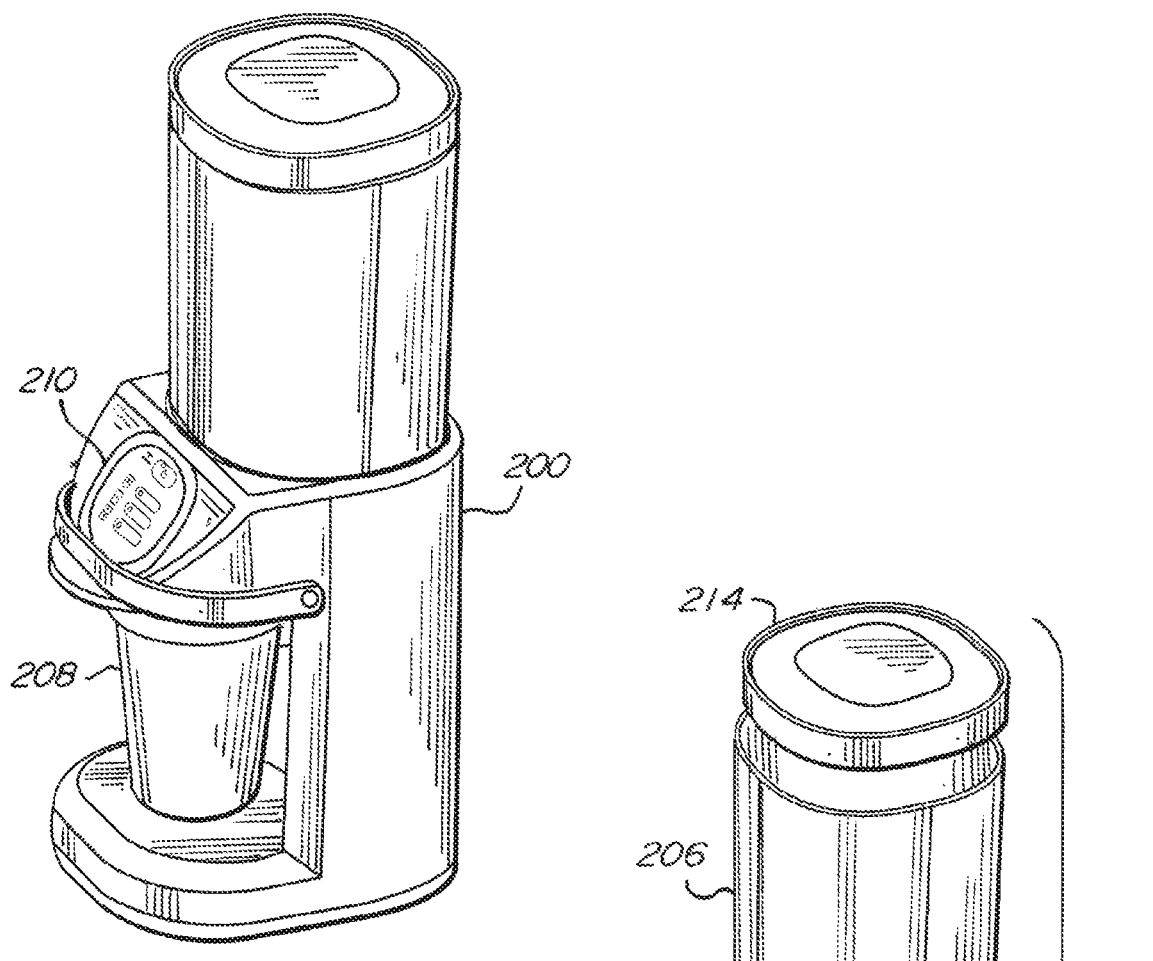
FIG. 10 is a is a perspective view of a fresh-serve pet food system according to a second exemplary embodiment.
Figure 14:
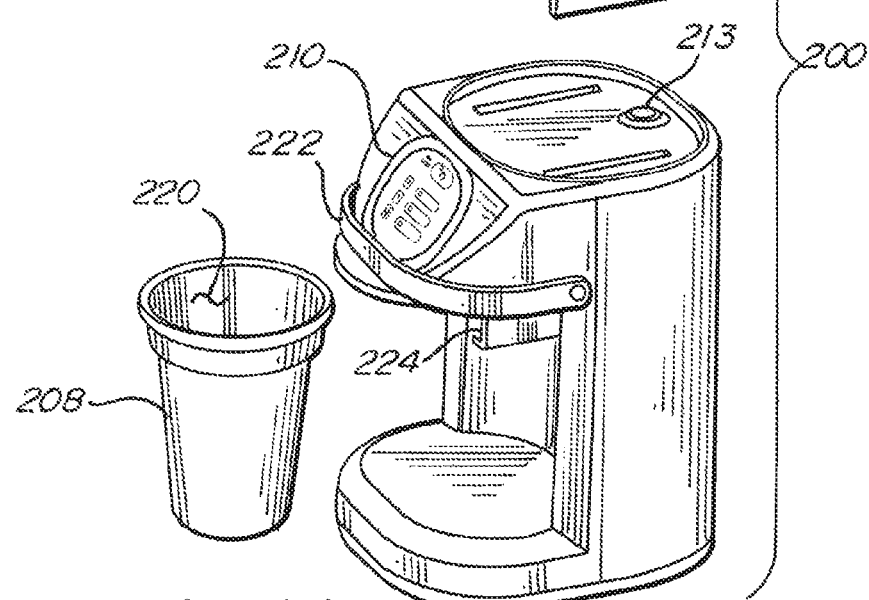
FIG. 14 is an exploded view of the system of FIG. 10.
Figure 9:
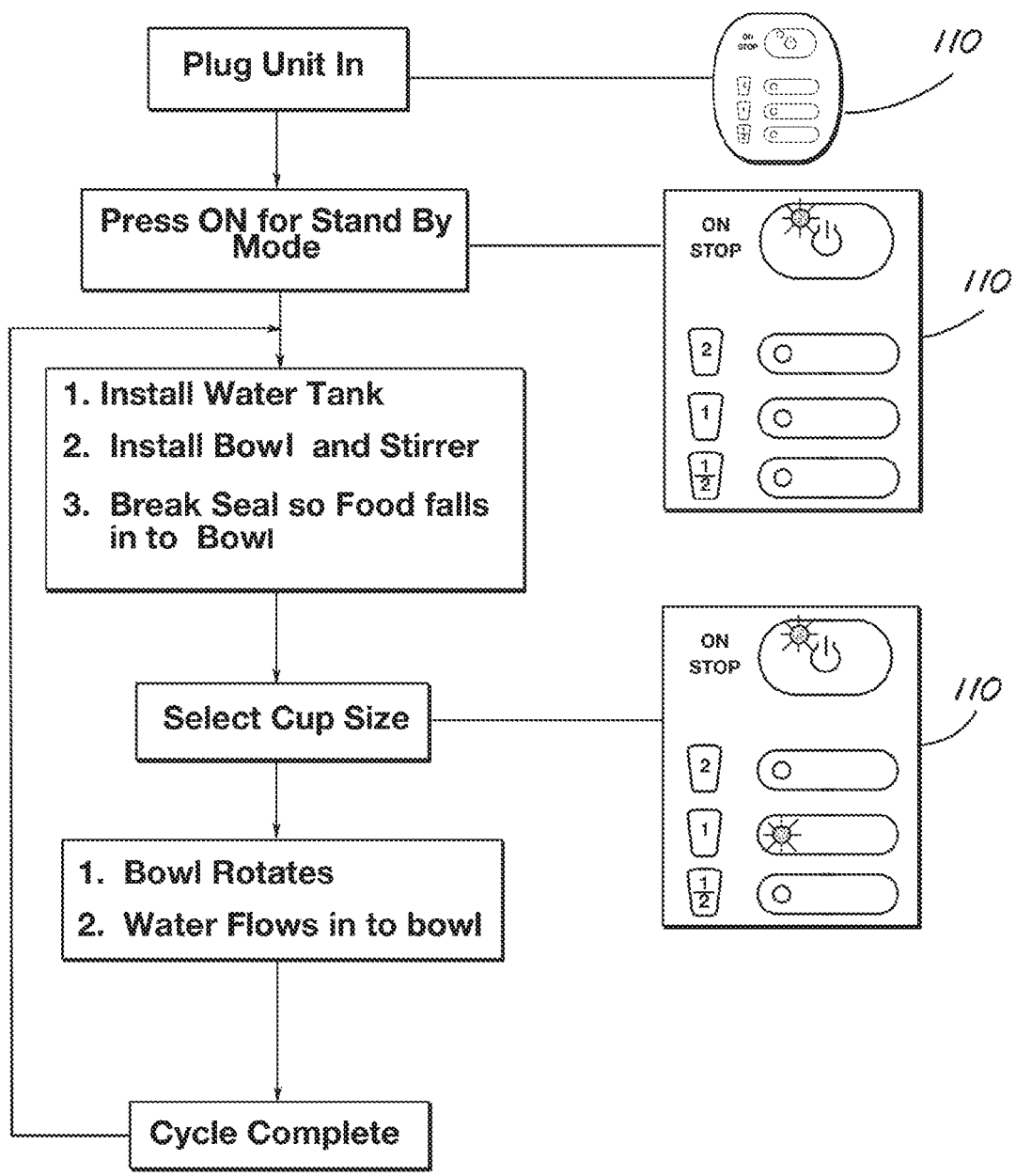
FIG. 9 is a flow diagram of the steps used to make fresh pet food using the system of FIG. 1.
Figure 12:
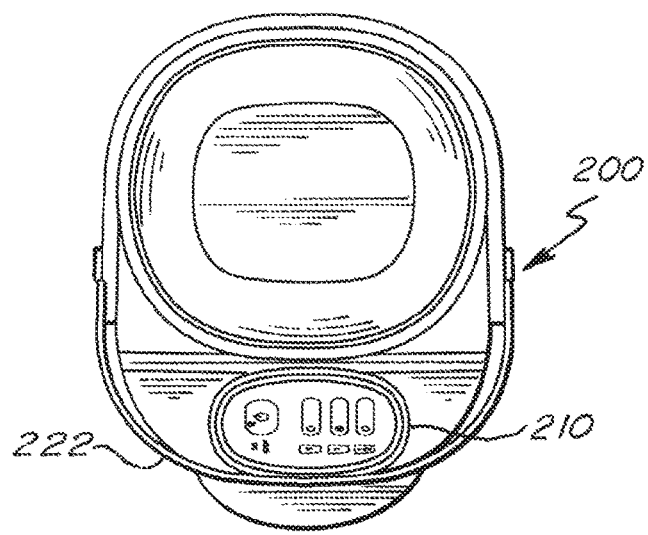
FIG. 12 is a top view of the system of FIG. 10.
Figures 11, 13:
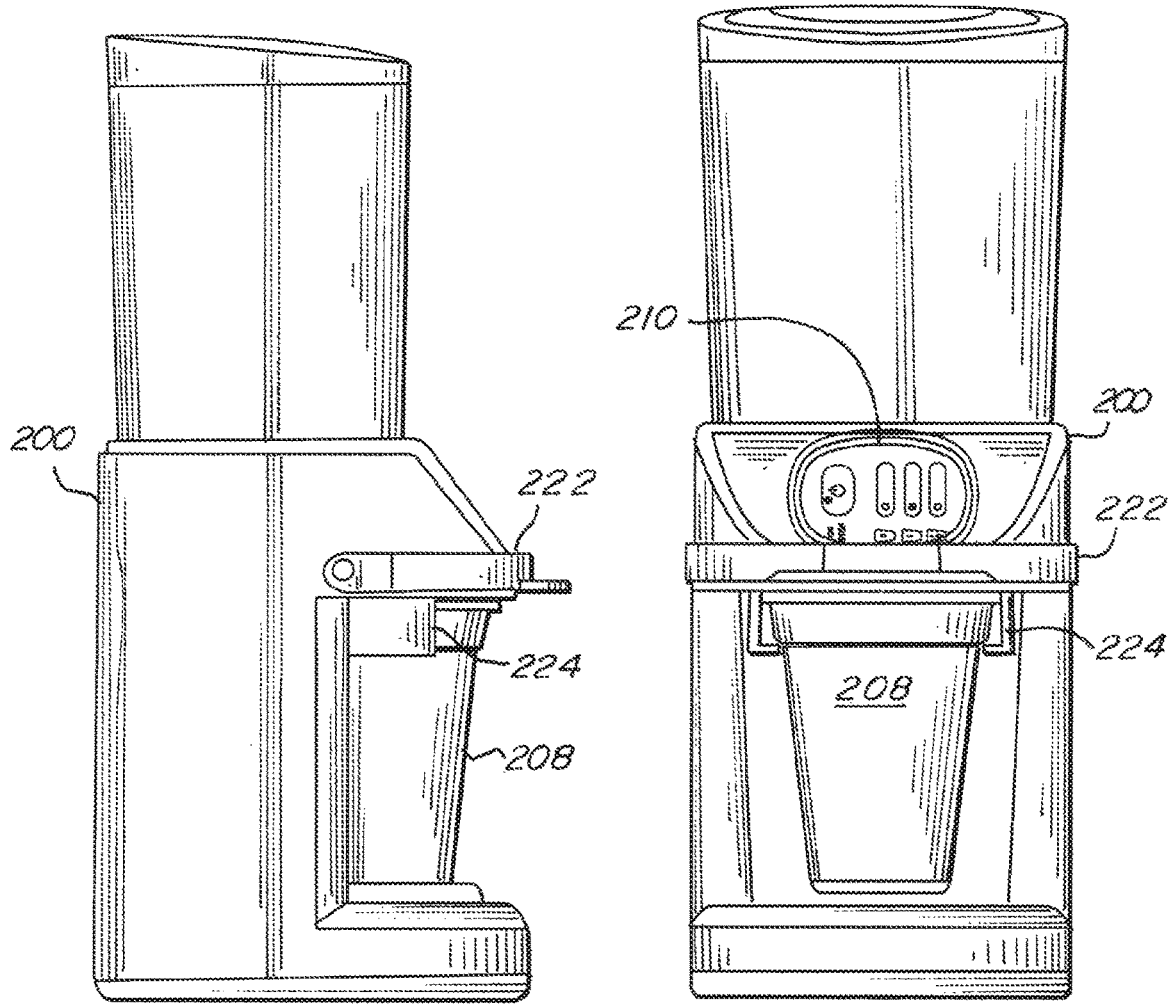
FIG. 11 is a front view of the system of FIG. 10.
FIG. 13 is a side view of the system of FIG. 10.
Figure 18:
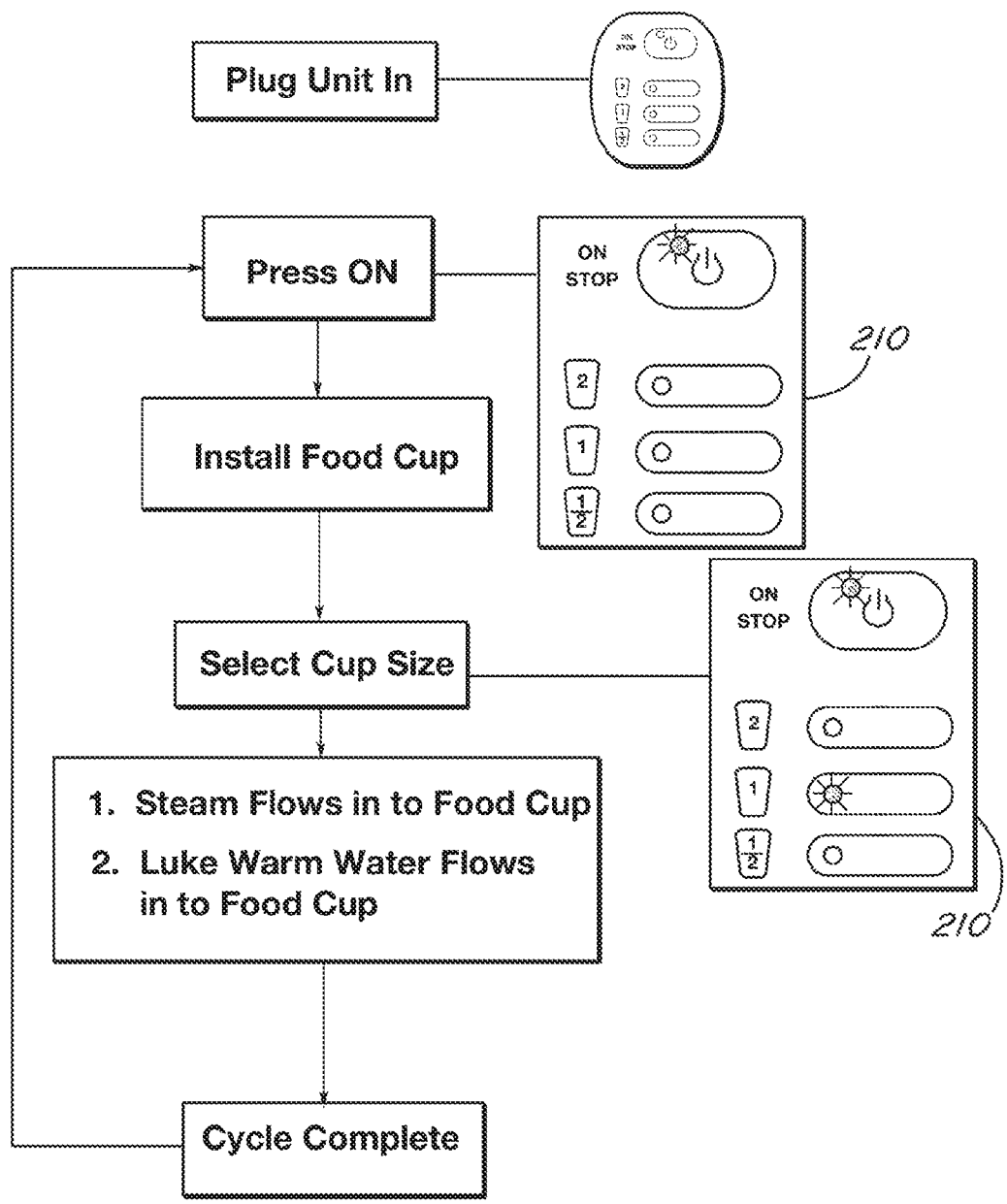
FIG. 18 is a flow diagram of the steps used to make fresh pet food using the system of FIG. 10.
Figure 21:
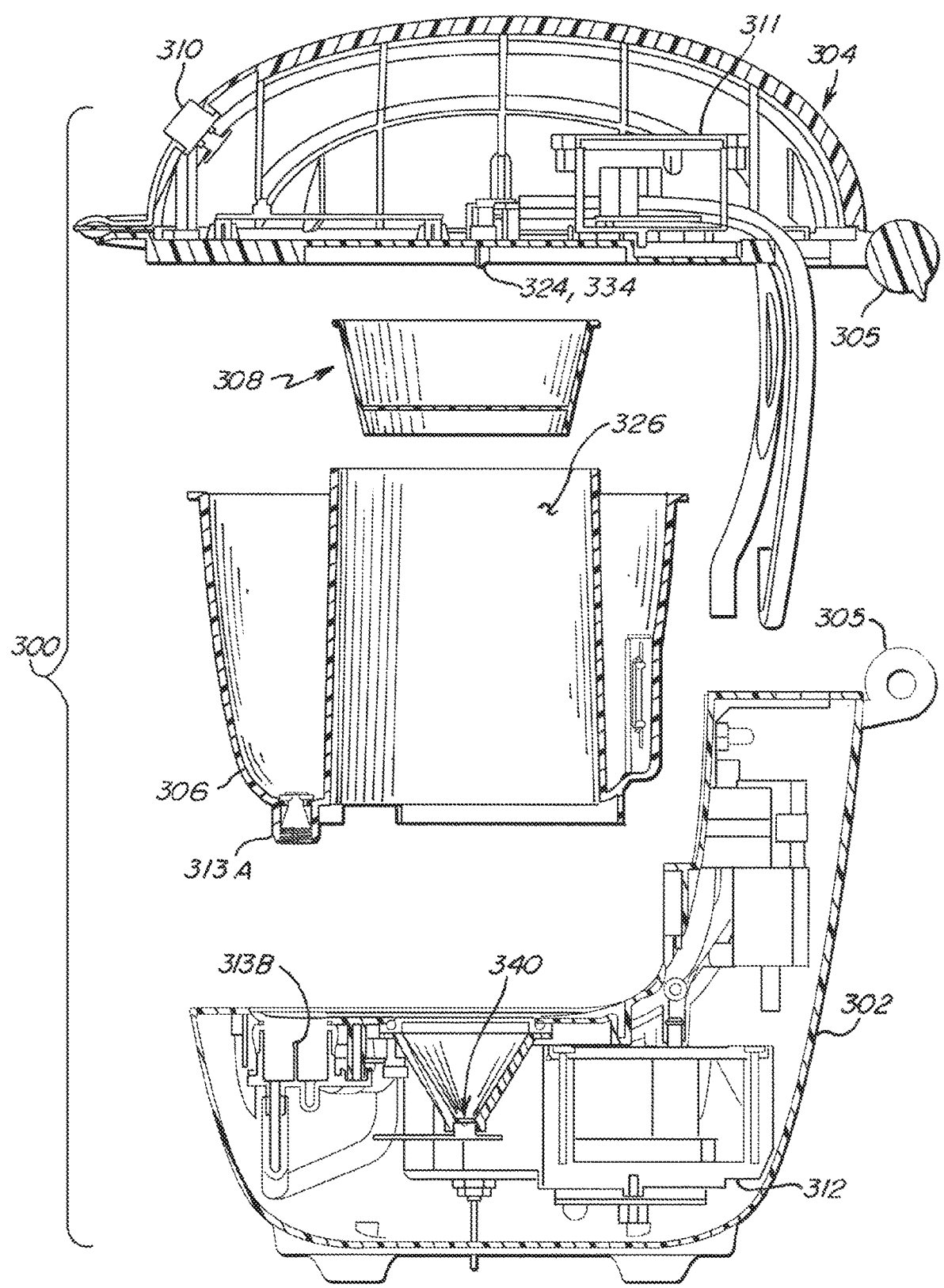
FIG. 21 is an exploded cross sectional view of the system of FIG. 19.

The water tank engages valve 113 when it is properly disposed on the base to allow water to be available to the pump when energized. The unit is then powered on, whereby it will wait in "standby" mode for user input before it proceeds as shown in FIG. 6E and in the flow chart of FIG. 9.

Control panel 110 communicates with water pump 130, heater 131, and turntable motor 132 through a smart controller integral with the control panel. The cup size or quantity being used is next entered by the user so that the controller can determine the amount of water that will be required, and that amount of water is then pumped from tank 106 through energized heater 131 and into the food in bowl 104 through conduit 136 as seen in FIG. 6E. The heater is a tubular heater in series with the conduit and heats the water as it flows therethrough, according to the energy it selectively provides, and without requiring any delay to bring the entire volume of water to temperature. This allows the controller to heat the water to different temperatures as needed. The initial blast is very hot water of a temperature over 140 F, which may be in the form of steam, which penetrates the dried food and then steeps for a defined period of time as the controller waits. This efficiently rehydrates and cooks the food, and kills any undesirable bacteria or germs, such as *salmonella* or *E-coli*. This also brings freeze-dried food back to its pre-freeze-dried consistency and flavor, brings dehydrated food back to its pre-dehydrated consistency and flavor, and cooks raw food.

It should be apparent that, while this exemplary embodiment employs a motorized water pump, numerous equivalent means may otherwise be used to move the water, such as gravity, thermal expansion (as used in common drip coffee makers), a piston, or any other known means, and that as used herein, the term "water pump" is not intended to be limited to only a motorized water pump, but is intended to encompass any such equivalent means.

Figure 7:
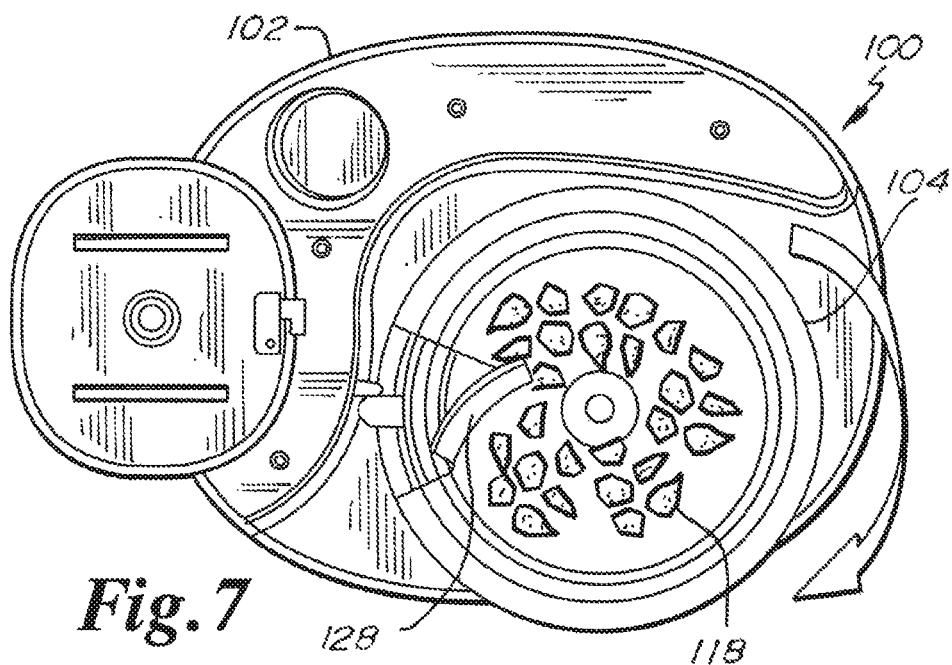
FIG. 7 is a cross-sectional top view of the system of FIG. 1 during stirring.
Figure 8:
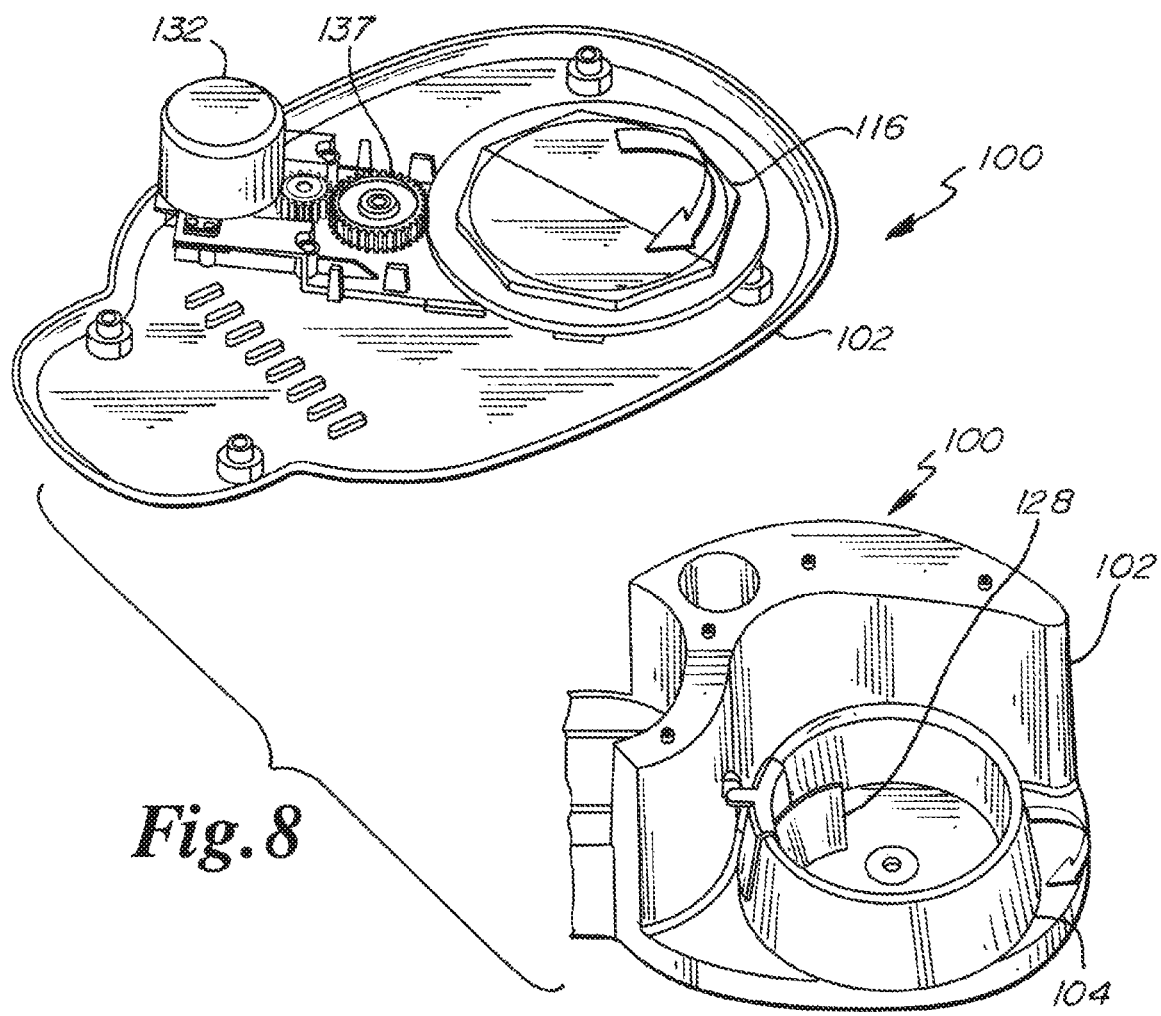
FIG. 8 is a partial perspective view of the stirring mechanism of the system of FIG. 1.

While adding the steam and during steeping, the controller energizes motor 132 to cause turntable 116 to rotate, by the engagement of gear train 137, to cause a slow rotation of the turntable as shown in FIG. 7. The stirrer 138 comes into engagement with the base as the bowl turns, to become stationary and to thereby stir the food and water together in the rotating bowl as shown in FIG. 8. This fully mixes the food and water. The bowl rotates at approximately 4 RPM.

While the bowl continues to turn and stirring thereby continues, the controller again energizes pump 130 and heater 131, but this time sends less energy to the heater and pumps more water into the food. This water is stirred into the rotating food for one more minute to wet the food and create a delicious and gravy, and to give the food a moisture content that is easier to consume and digest.

This second dose of water is heated only to a temperature that, when mixed into the hot food already in the bowl, will cool the food back down to a serving temperature of between 95 F and 105 F. Studies have shown that dogs and cats, having evolved from predators, prefer to eat food within that temperature range because it mimics the temperature of a "fresh kill". While the initially higher temperature allows the most effective cooking and re-hydration of the food, it is too hot to be served as it would burn the pet's mouth and be otherwise undesirable. And while the cooler second dose of water results in food that is more readily edible, it is not hot enough to sanitize and cook the food. So, this two-step moistening technique is uniquely capable of serving pet food that is both properly and safely prepared, as well as deliciously and safely served.

Rotation of the turntable then stops, a "ready" lamp is energized to indicate the cycle is completed, and the food bowl may now be removed and presented to the pet for feeding. The entire preparation, from loading the appliance to serving the prepared food to the pet, requires only three minutes, more or less.

Referring next to FIGS. 10 through 18, a second exemplary fresh-serve pet food maker 200 is shown. The maker has a base 202, a food cup 208, and a water tank 206. In this embodiment, the meal is prepared in the right-side-up food cup and then served from the cup into some other means, such as into a separate food bowl (not shown). The base is adapted to receive the water tank and the food cup as shown. The base has a control panel 210 which provides a user interface for operation.

The lid 214 is removed ant the water tank 206 is filled with water similarly to the first embodiment. The water tank engages valve 213 as it is placed on the base, to allow water to be available to the pump when energized.

Food cup 208, which may be the same as the food cup of the first embodiment, has one of a variety of volumes according to the pet's diet, and contains the food as earlier described. Also as earlier described, the food is sealed in the cup by a foil top 220.

The base's lever 222 is lifted as in FIG. 15A. The cup is then slid top-side-up into cup receiving slot 224 as in FIG. 15B. As lever 222 is then pushed back down as shown in FIG. 15C, it forces the lever's piercing spouts 226A and 226B (which are best seen in FIG. 17) through the foil top.

The unit is then powered on, whereby it will wait in "standby" mode for user input before it proceeds. Control panel 210 communicates with water pump 230 and heater 231 through a smart controller integral with the control panel.

The cup size is next selected by the user so that the controller can determine the amount of water that will be required. Some water is next pumped from tank 206 through valve 213 and conduit 236, and into heater 231, where it is heated at high energy into steam (or water having a temperature over 140 F). The steam flows into cup 208 through intake spout 226A to moisten and/or cook the food therein through spout 226A. Vent spout 226B allows air to escape the cup in proportion the volume of steam taken in.

After a one minute pause time, which could be adjustable to a different time period as short as 30 seconds according to other factors such as food type, to allow the steam to fully penetrate, re-hydrate, and/or cook the food, the controller causes more water to be pumped into through heater 231, where it is heated with less energy, and into cup 208 to fully wet the food therein for serving. Again, as in the first embodiment, the second dose of water is only heated to a temperature that will result in a final food temperature of between 95 F and 105 F. The controller pauses for another minute before a "ready" lamp is energized to indicate the water has had sufficient time to consistently moisten all of the food, and that the cycle is now completed and the food is ready for serving. The lever is then lifted, and the food cup may now be removed, its foil top peeled off, and its contents poured into a pet food bowl or such and presented to the pet for feeding. Again, the entire cycle from loading the appliance to serving the food only requires three minutes, more or less.

Referring to FIG. 19 through 36 a third exemplary embodiment is shown, which includes means for recognizing the contents of a container and preparing the pet food therein according to those contents. While this feature is disclosed only in the third embodiment, it should be appreciated that this feature could be similarly employed by the earlier two embodiments.

The third exemplary fresh-serve pet food making appliance 300 has a base 302, a lid 304, a water tank 306, and a food cup 308. In this embodiment, the meal is prepared in the right-side-up food cup and then served from the cup into some other means, such as into a separate food serving bowl (not shown). The base is adapted to receive the water tank and the food cup as shown. The base has a single pushbutton activation switch 310 which communicates with a controller 311 to provide a one-step user interface for operation.

Figure 32:
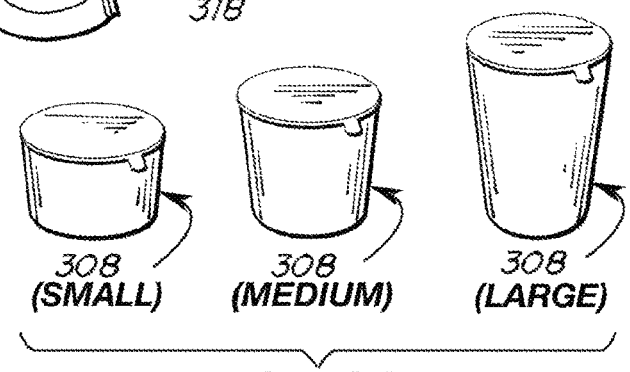
FIG. 32 is a series of top perspective views of food cups for the system of FIG. 19.
Figure 34:
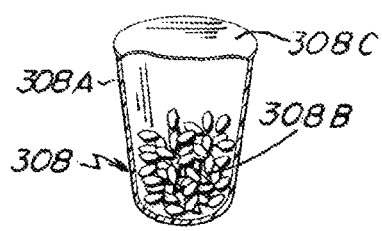
FIG. 34 is a partially cross sectioned view of a food cup for the system of FIG. 19.
Figure 33:
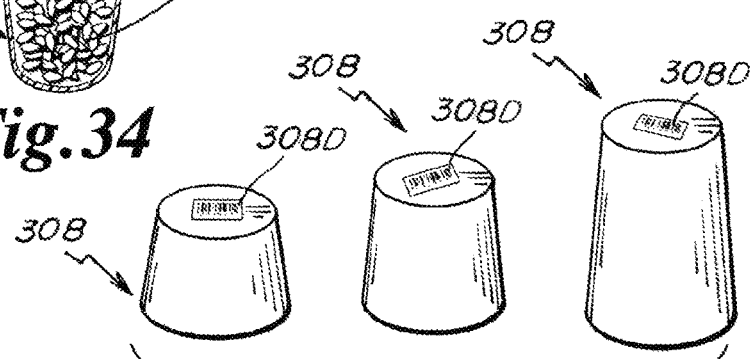
FIG. 33 is a series of bottom perspective views of food cups for the system of FIG. 19.
Figure 25:
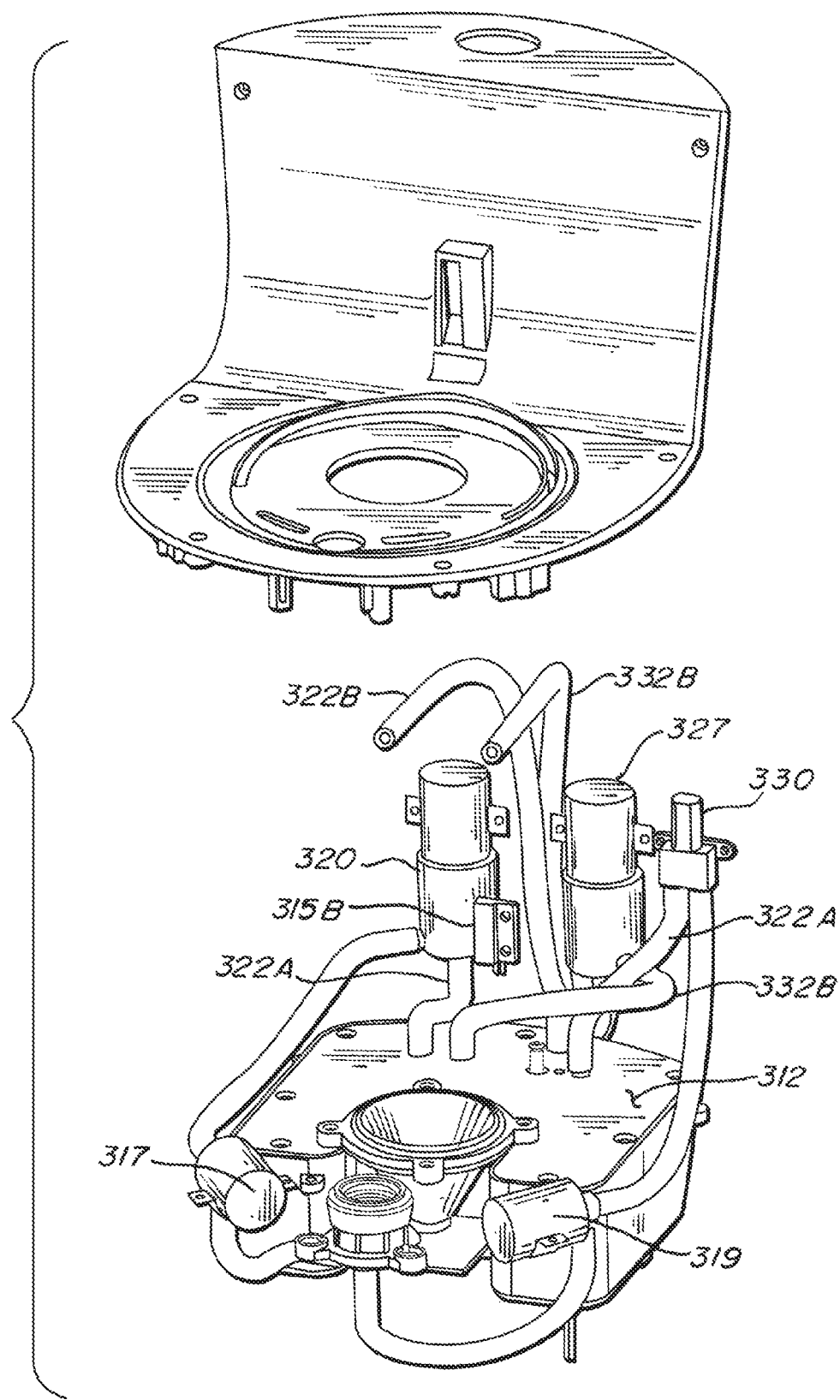
FIG. 25 is a front perspective partial exploded view of the base of the system of FIG. 19.
Figure 26:
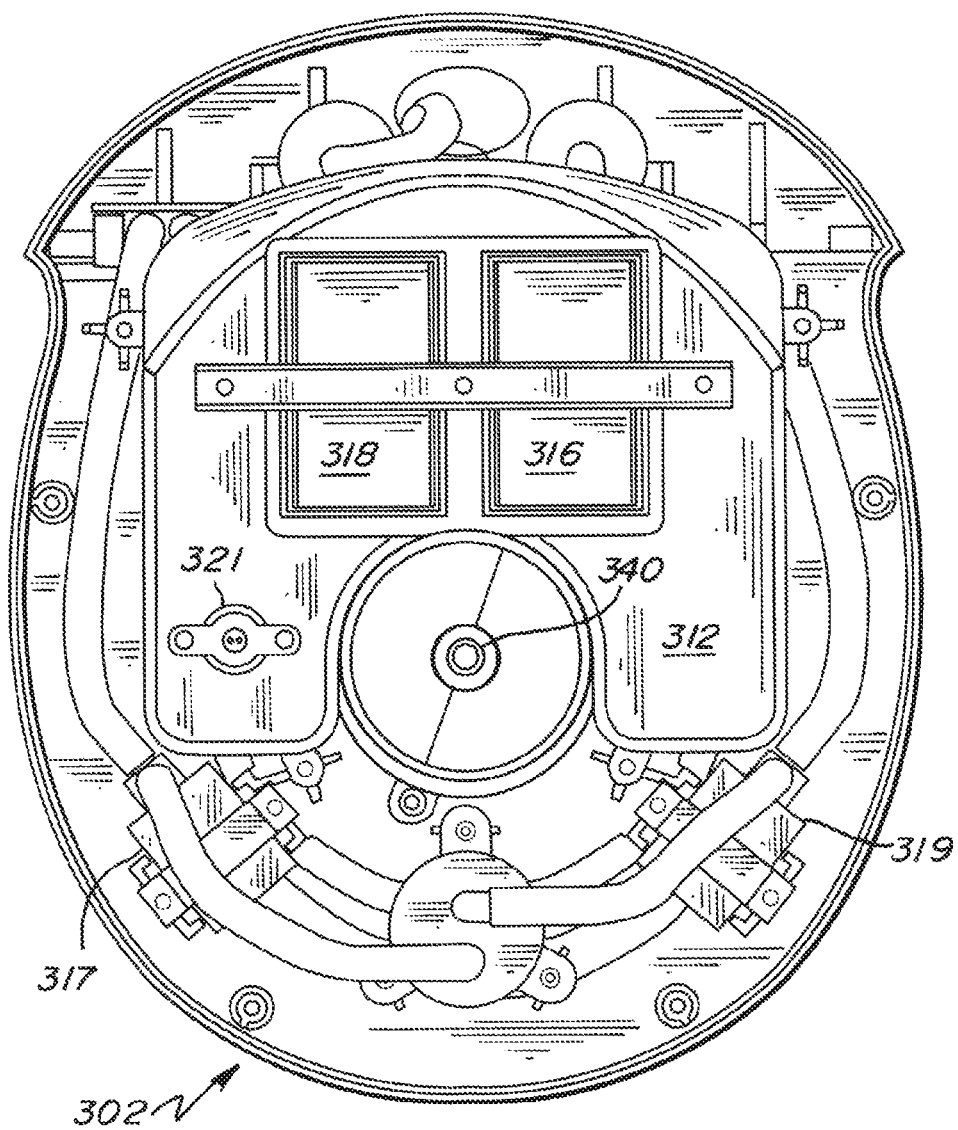
FIG. 26 is a bottom view of the system of FIG. 19 with its bottom cover removed.
Figure 27:
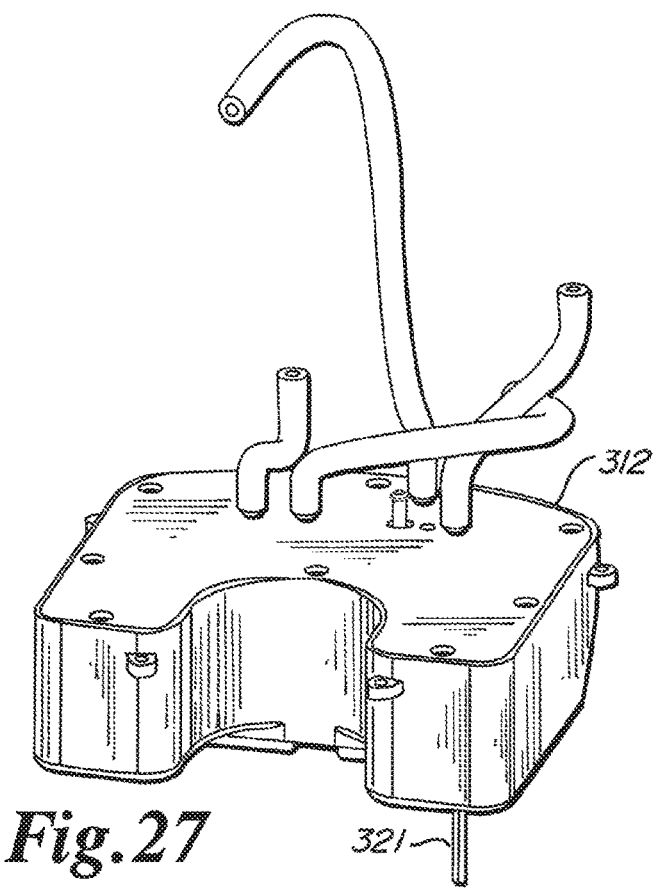
FIG. 27 is a top perspective view of the heating chamber of the system of FIG. 19.
Figure 28:
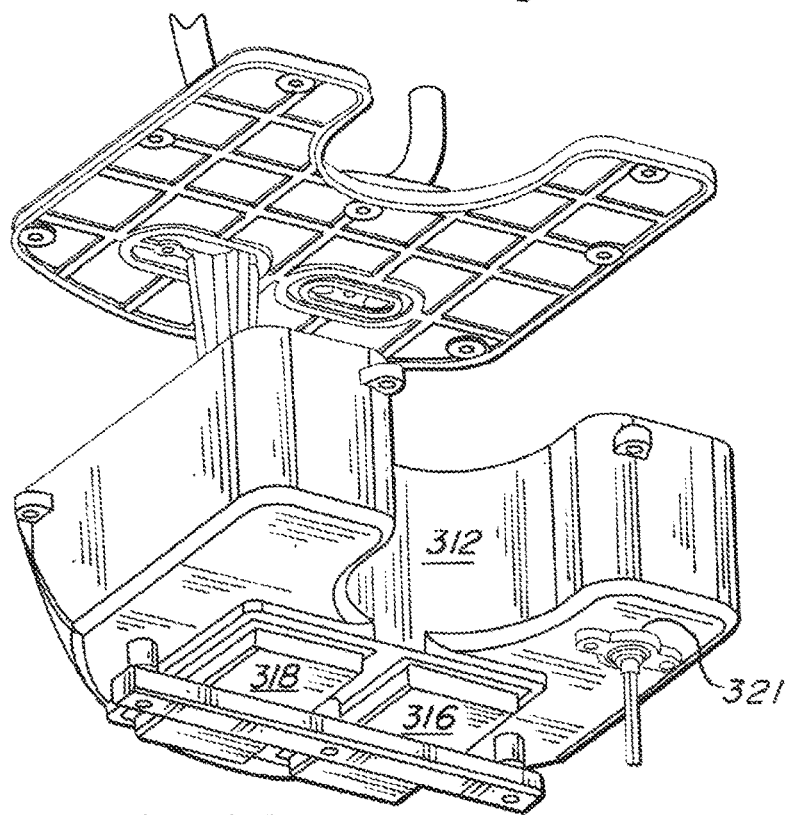
FIG. 28 is a bottom perspective exploded view of the heating chamber of the system of FIG. 19.

The food cup is available in multiple sizes, some of which are shown in FIG. 32. All of the cups have the same top diameter and the same angle of taper to a smaller bottom diameter which varies according to the cup's volume. The food cup consists of a cup portion 308A which initially holds an amount of unprepared pet food 308B and has a sealed cover 308C over the top diameter. The cover may be made of foil or a thin plastic sheet which hermetically seals the food within the cup portion as seen in FIG. 34. As seen in FIG. 33, the outside bottom of each cup portion is marked with a printed UPC code 308D, unique to each of a variety of food cups. The UPC code may not only be used for pre-consumer inventory purposes but is also used by the appliance to identify the size and contents of the food cup, as will be explained later.

The lid 304 is lifted relative to the base about hinge 305 and the water tank 306 is removed and filled with water, such as at a tap. Springs and mechanism within the lid hold it temporarily in its open upward position. The appliance is electrically disabled when the lid is lifted to prevent inappropriate operation by a switch 323 which is mounted within one of the base and lid and engaged by the other during relative movement between the two. When the lid is lifted, the switch is open and the appliance is disabled. When the lid is closed back down to its normal operating position, the switch is closed to enable selective operation of the appliance.

The water tank includes float-enhanced magnet 315A, which moves up and down according the level of water in the tank and communicates magnetically with magnetic switch 315B disposed within the base to disable the appliance when the water tank lacks sufficient water for proper operation. The water holding portion of the water tank surrounds an integrally formed central food cup pocket 326 for positioning and retaining the food cup. Alternatively, the food cup pocket could be integrated directly into the base. Either way, it is understood that the base supports the food cup either directly or indirectly through its support of the tank.

Figure 29:
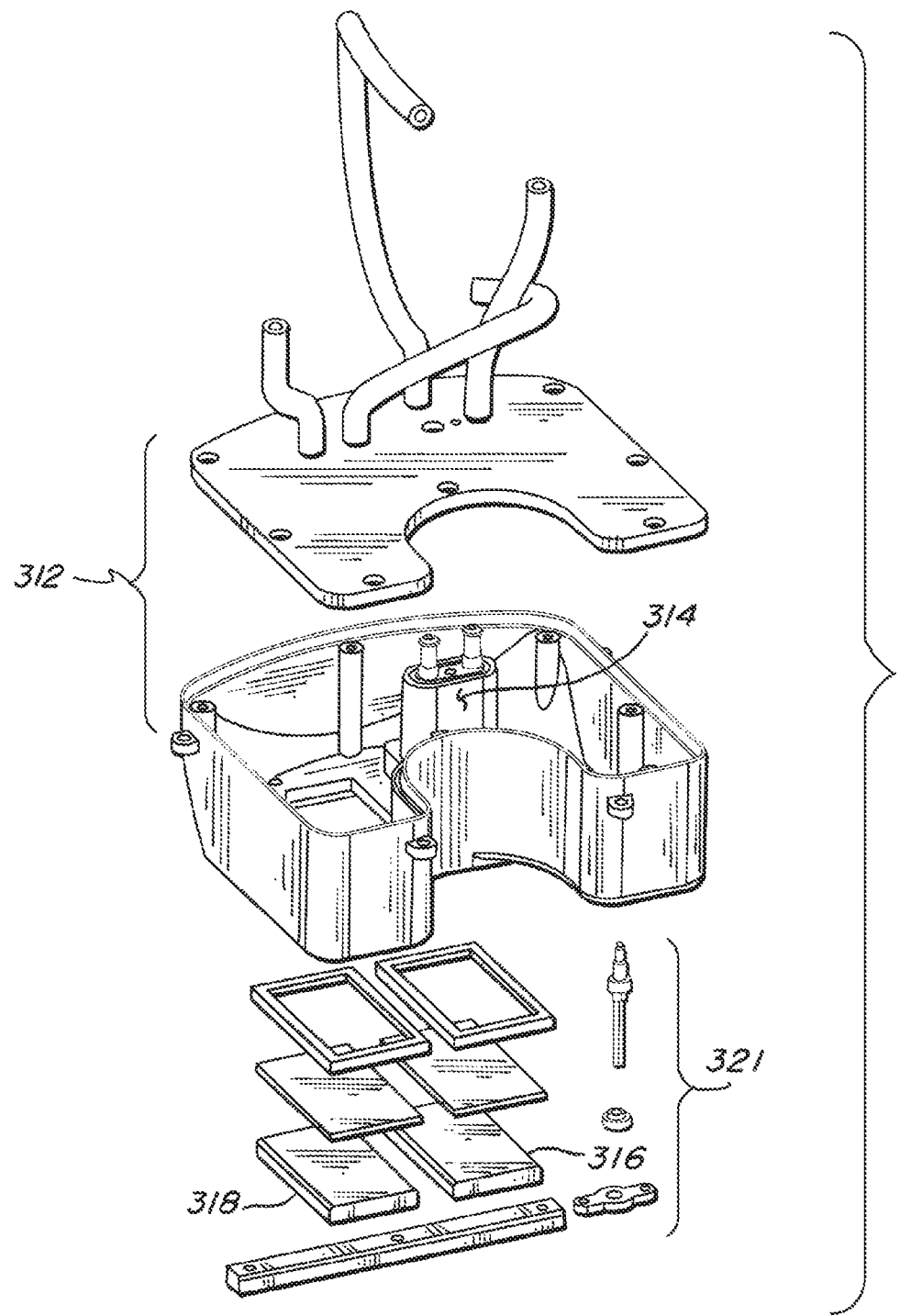
FIG. 29 is a top perspective exploded view of the heating chamber of the system of FIG. 19.
Figure 30:
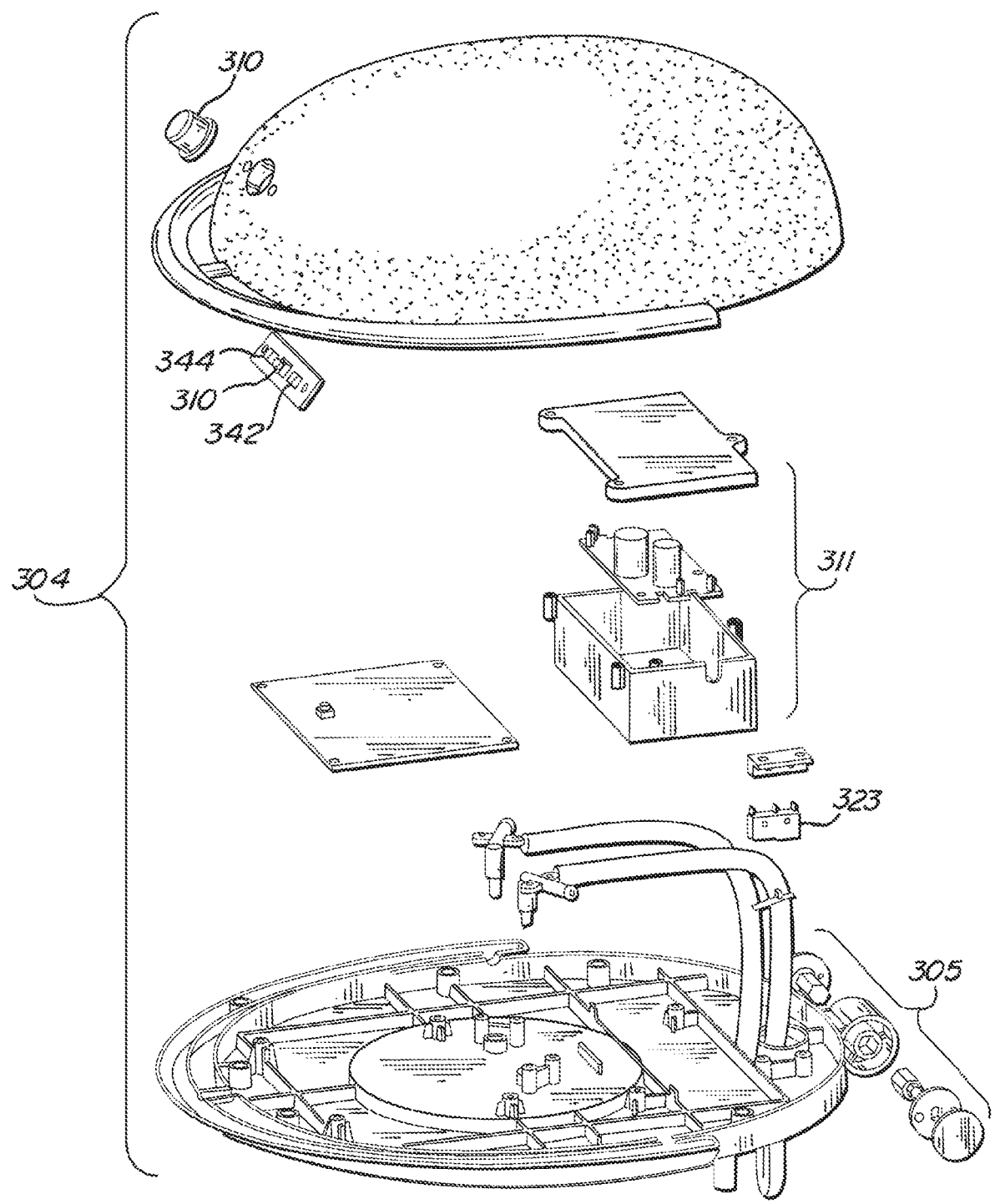
FIG. 30 is an exploded view of the lid of the system of FIG. 19.
Figure 31:
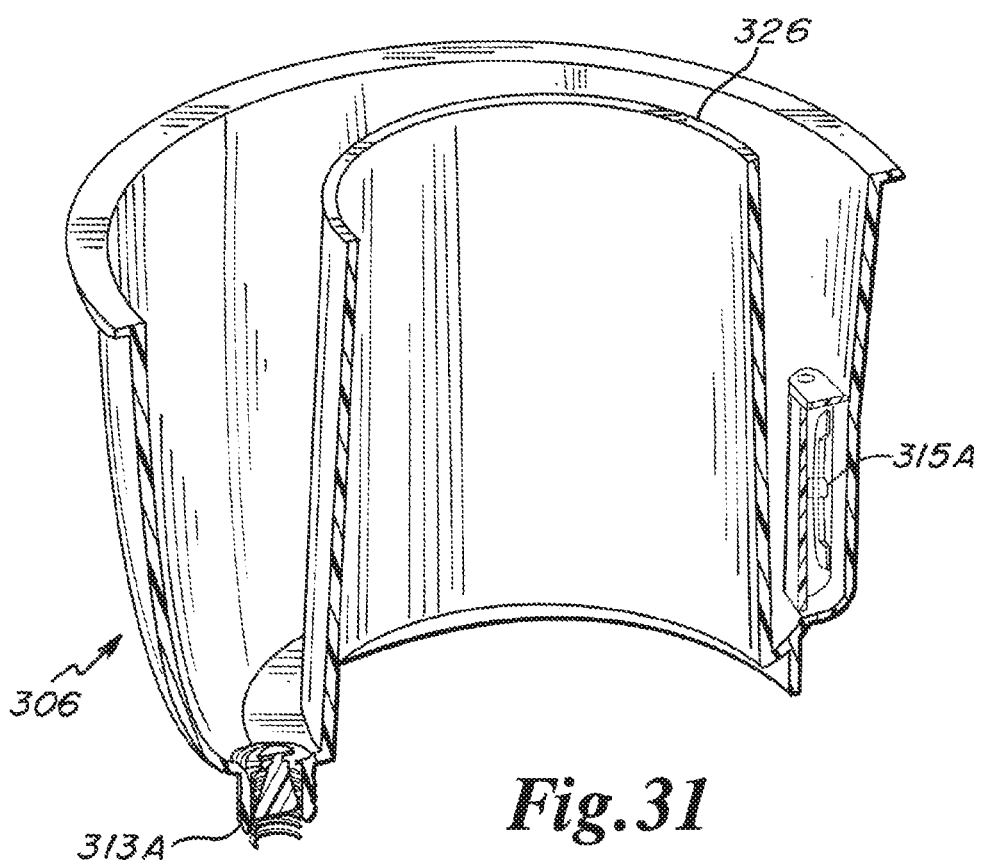
FIG. 31 is a cross-sectioned perspective view of the water tank of the system of FIG. 19.
Figure 35:
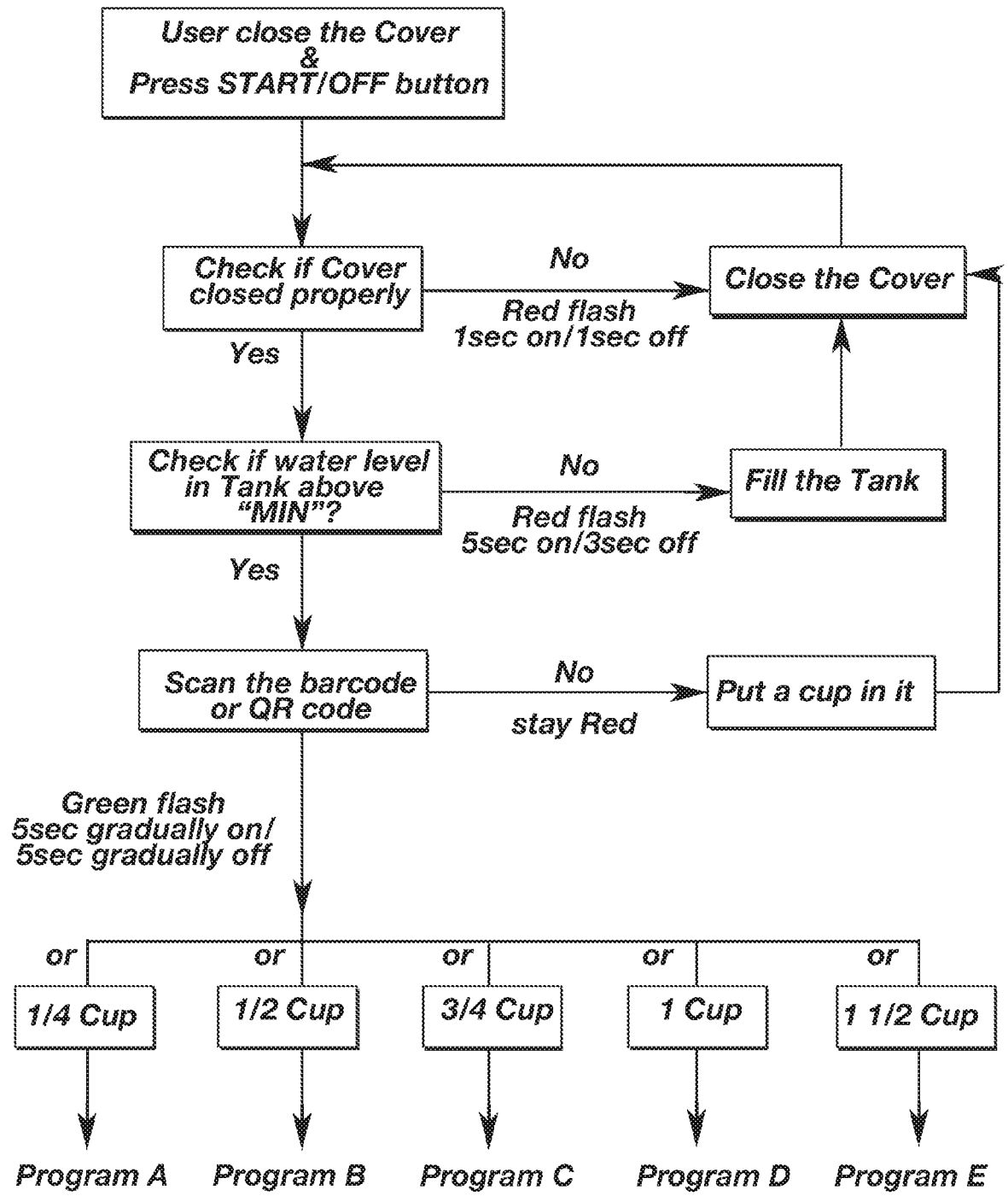
FIG. 35 is a system flow diagram for the system of FIG. 19.
Figures 36, 37:
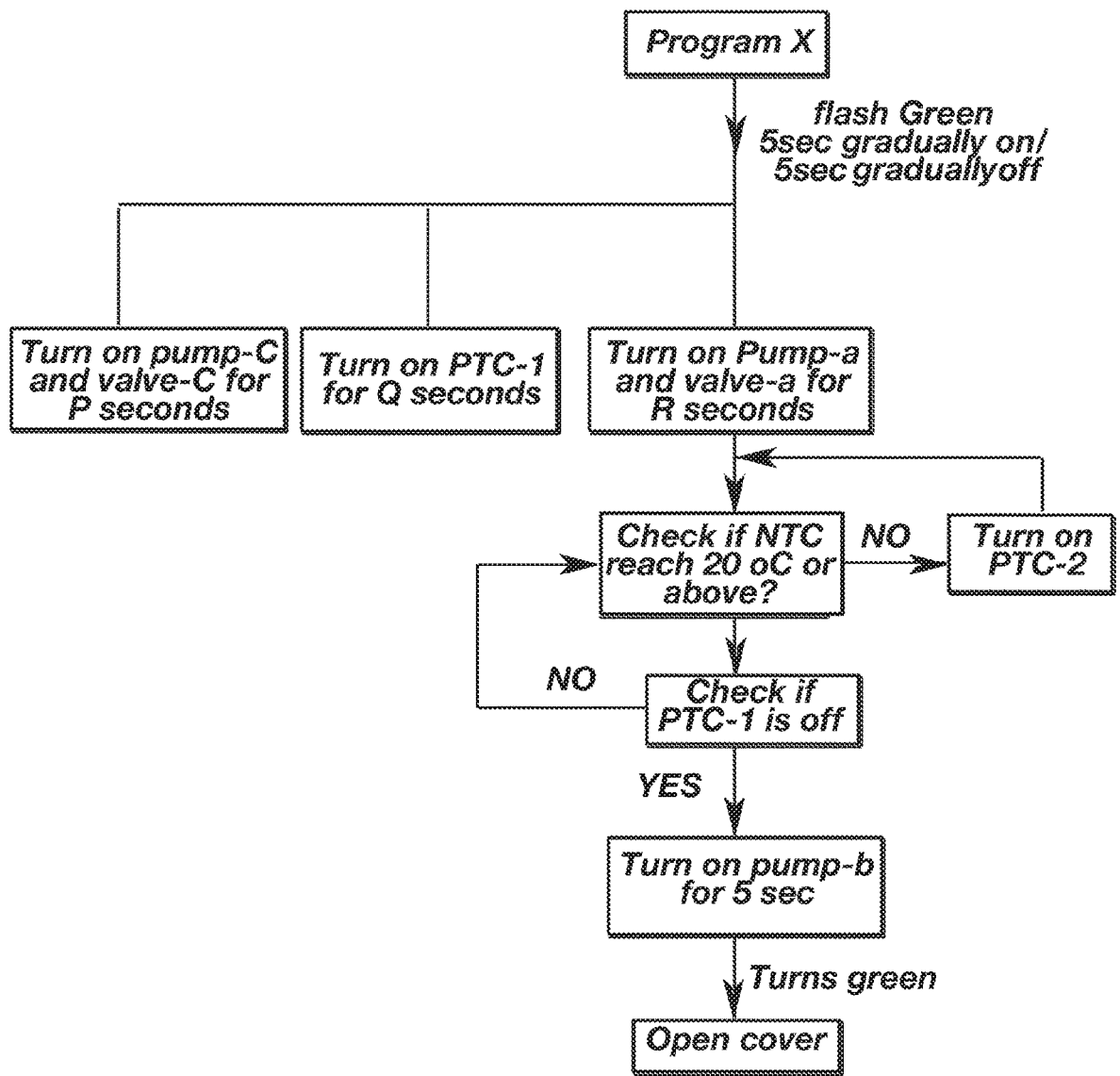
FIG. 36 is a first portion of a controller function diagram for the system of FIG. 19.
FIG. 37 is a second portion of the controller function diagram for the system of FIG. 19.

When returned to the base, the normally closed tank valve 313A disposed on the bottom surface of the water tank engages and communicates with valve actuating post 313B of the base, to allow water to flow from the tank through conduit tubings to the inputs of water check valve 317 and steam check valve 319, both of which only allow water to flow away from the tank but not back towards the tank. The outlet of water check valve communicates through additional conduit tubing with a fluid transfer device and then on to the heating chamber 312 disposed within the base, and the outlet of the steam valve communicates through still-additional conduit tubing with another fluid transfer device and then on to the steam generating chamber 314, which is disposed within the heating chamber as best seen in FIG. 29 and shares a common metallic bottom surface therewith.

Upon instruction from the controller, the heating chamber is heated by water-heating PTC heater 316 and the steam generating chamber is selectively heated by steam generating PTC heater 318. The PTC heaters are mounted against the underside of the metallic bottom surface with a thermally-conductive paste sandwiched between to enhance thermal conductivity from the heaters to the chambers so that when one of the PTCs is energized the water in the associated chamber is heated into either hot water or steam, respectively. NTC device 321 is mounted against the metallic bottom surface and employed as a thermostat to communicate with the controller and monitor and control the temperature within the heating chamber by controlling operation of PTC 316. Operation of PTC 318 to produce steam is controlled by a timer within controller 311.

The outlets of the aforementioned fluid transfer devices communicate with the chambers to enable the output of the product of the associated chamber to the container. The fluid transfer devices may be in the form of a pump where needed, or simply a valve where possible. In the described embodiment, the inlet of the heating chamber is connected by conduit tubing 322A to the outlet of tap water pump 320, and conduit tubing 322B connects the heating chamber to water spout 324 through hot water pump 327. The water spout hangs downwardly from the underside of the lid and, when the lid is closed, into food cup pocket 326 of the water tank. Similarly, the inlet of the steam generating chamber is connected by conduit tubing 332A to the outlet of steam pump 330, and conduit tubing 332B connects the outlet of this pump to steam spout 334, which also hangs downwardly from the underside of the lid and, when the lid is closed, into food cup pocket.

Figure 22:
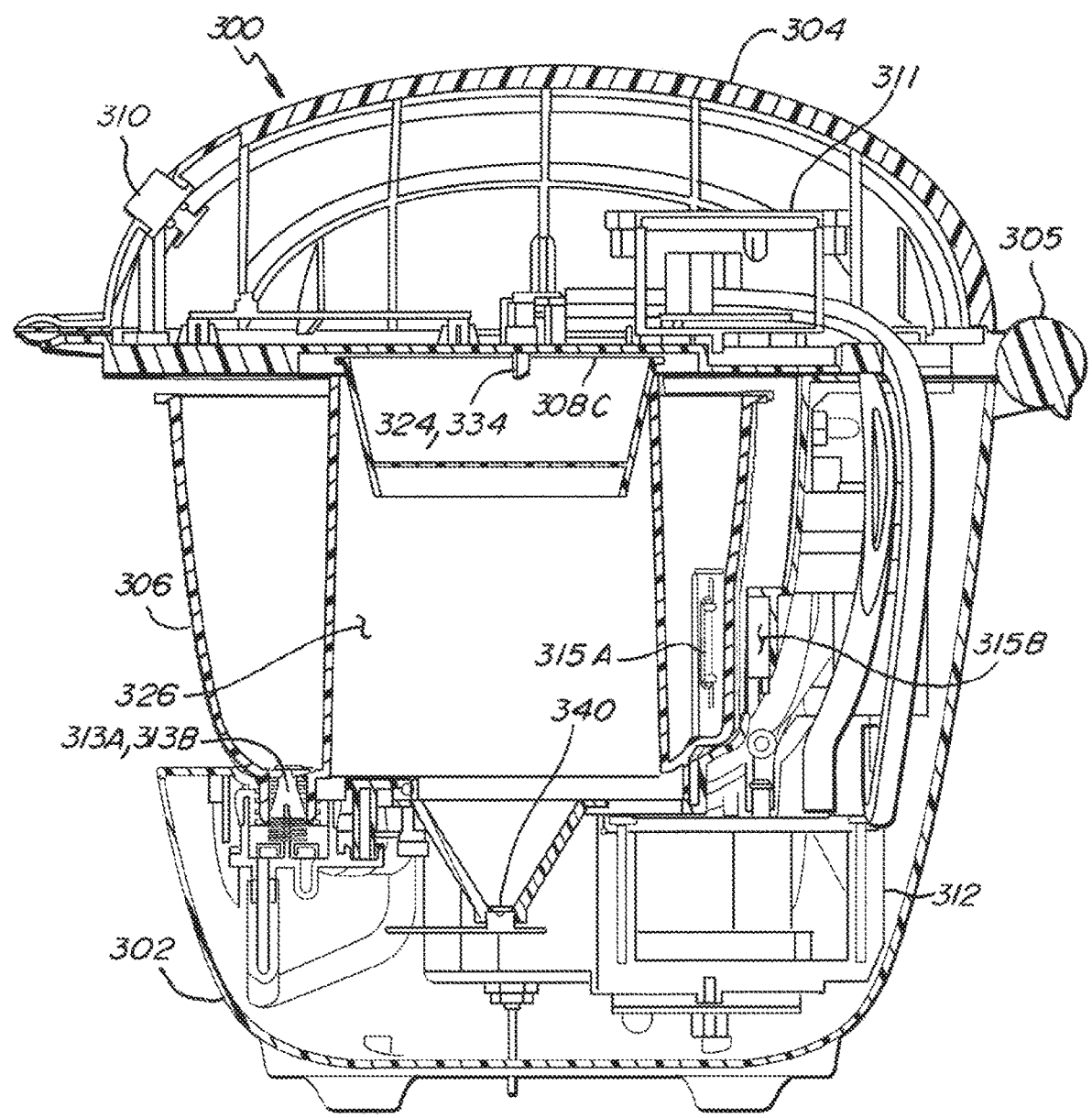
FIG. 22 is a cross sectional view of the system of FIG. 19 with its lid closed.
Figure 23:
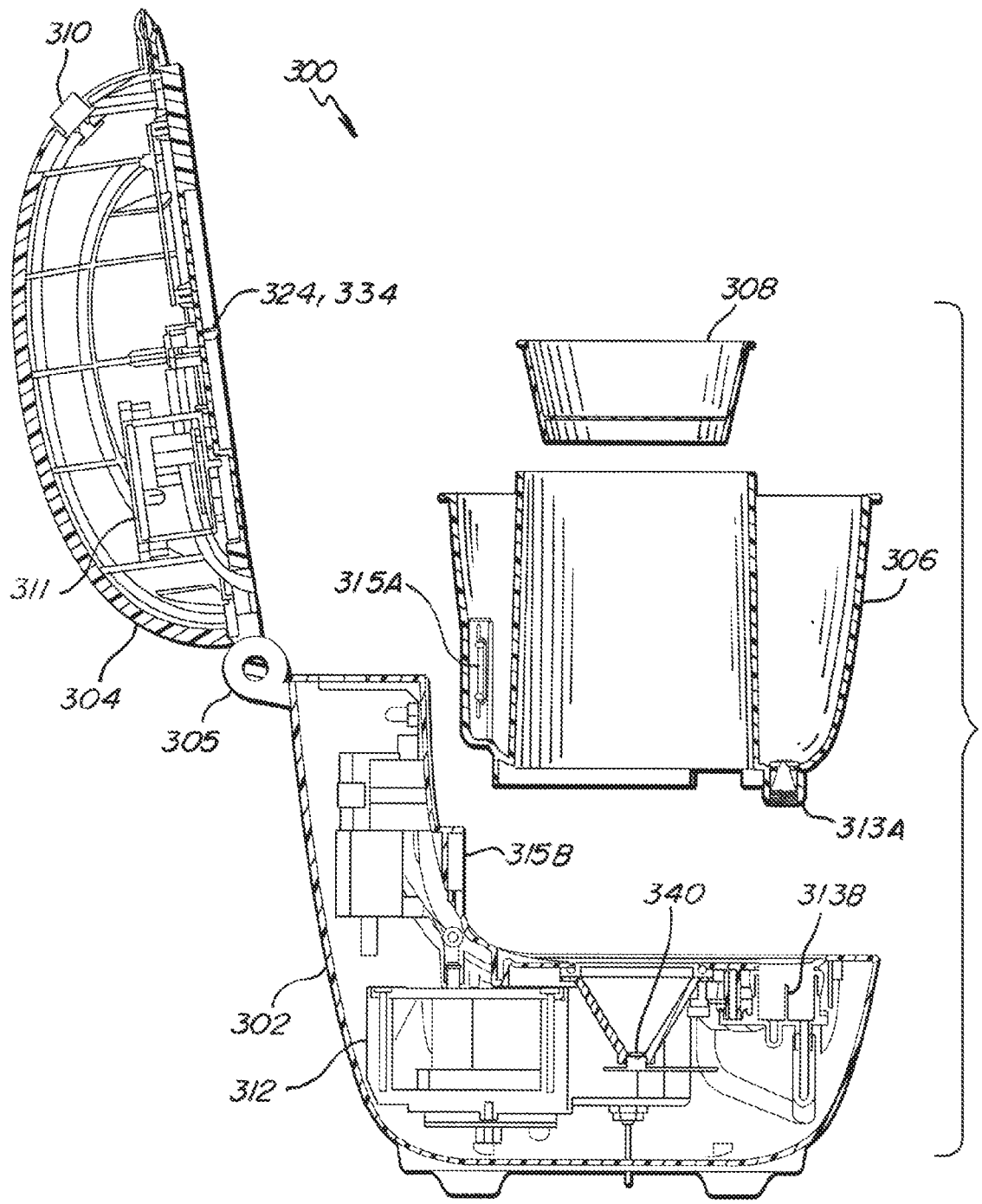
FIG. 23 is a cross sectional view of the system of FIG. 19 with its lid open.
Figure 24:
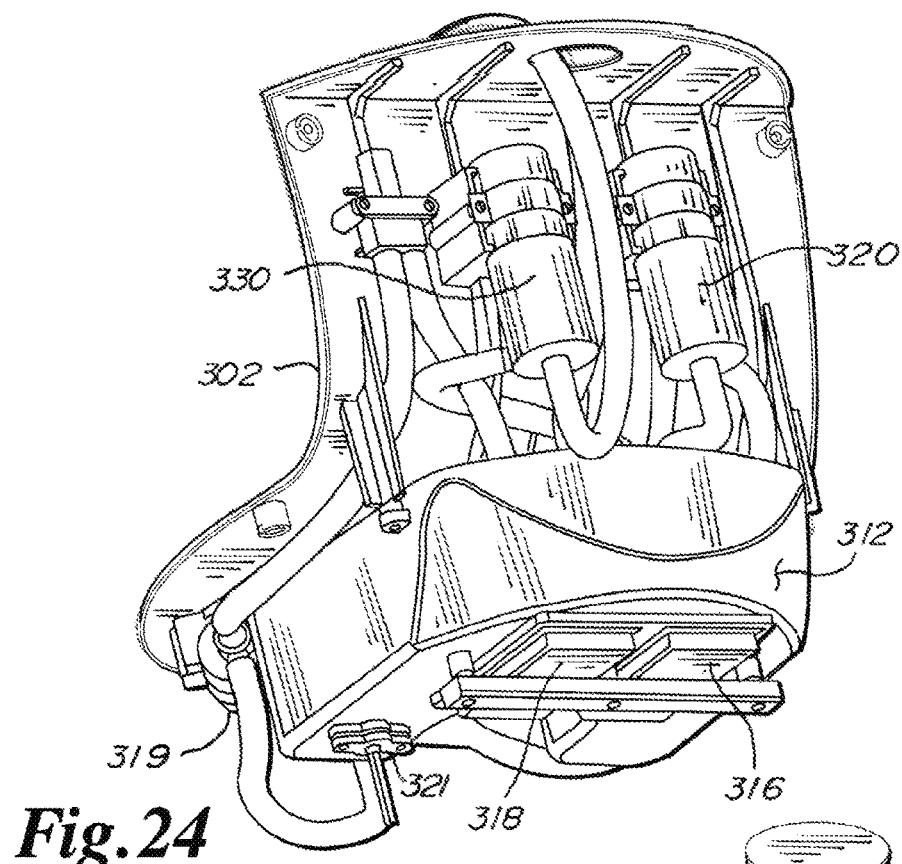
FIG. 24 is a rear perspective partial view of the base of the system of FIG. 19.

Both spouts are piercers that have sharp hollow tips similar to a hypodermic needle and are configured to pierce cover 308C when a food cup is placed into the food cup pocket and the lid is pushed down into is closed operation position, as best seen in FIG. 22, so that the heating chamber and steam generating chamber are now in fluid communication with the unprepared food 308B.

When the user presses switch 310 a single time, the food preparation proceeds to completion unless a problem is realized. First, controller 311 is activated and causes scanner 340 to scan for UPC code 308D to confirm that an authorized food cup is properly positioned within the food cup pocket and, if so confirmed, the controller enables selective operation of the appliance. If no cup is in place, or if a non-authorized food cup is in place, or if the placement of the cup is somehow improper, the appliance remains disabled and red indicator 342 flashes. The lid remains unlocked and may be lifted to re-position or replace the cup. If an authorized cup is recognized by the scanner, operation begins as follows.

The lid is locked in its closed position and green indicator 344 glows continuously. The controller consults a database to obtain preparation instructions associated with the specific UPC code scanned. This database may be stored within the appliance's memory or may be held externally and consulted by the controller via wireless means. For instance, the external database may exist in the Cloud and may be consulted through direct wireless internet connection. Or the database may exist in a smart phone application that can be downloaded to the user's smart phone and may be consulted by the controller through means such as Bluetooth. Such external data bases may be automatically updated as new food cup types and foods are introduced. In such wireless arrangements, the controller includes a wireless transmitter/receiver.

The preparation instructions include water volumes for hot water and steam generation, hot water temperature, and timing instructions intended to be used by the appliance to control the fluid transfer devices, PTCs, lid latch (if included), and indicators.

The red and green indicators alert the user whether 1) an authorized food cup is properly positioned, 2) the lid is properly closed, and 3) the water tank contains a sufficient amount of water. If any of these conditions are not found, the appliance is either completely disabled or the red indicator is made to glow or flash. If all of these conditions are found, the green indicator is made to glow continuously, and food preparation begins as follows;

1) Lid latch (if present) is energized to lock the lid in its closed position.
2) The steam pump 330 is energized to open for a period of time determined from the preparation instructions such that a proper volume of water flows from the water tank to the steam chamber, and the tap water pump 320 is energized for a period of time determined from the preparation instructions such that a proper volume of unheated water flows from the water tank to the heating chamber.
3) The steam generating PTC is energized for a period of time determined from the preparation instructions as necessary to convert all of the water therein into steam, and the hot water PTC is energized and the water within the hot water chamber is heated until that chamber's NTC senses that the water within has reached a temperature determined from the preparation instructions.
4) Once the steam has been generated, it flows by its own pressure into the food cup through the steam spout to saturate and cook food 308B.
5) A steeping time period determined from the preparation instructions is initiated during which the food steeps in the steam.
6) Once the steeping period has passed, hot water pump 327 is energized to send the heated water into the food cup through the hot water spout to reduce the temperature of the now-cooked food to a tolerable temperature level and to optimally wet the cooked food, such as to create a gravy.
7) A resting time period determined from the preparation instructions is initiated during which the temperature and moisture of the cook food homogenizes.
8) Once the resting period has passed, the green indicator is made to flash to indicate that the food is now ready for serving to the pet and the lid latch (if present) is de-energized to allow the user to open the lid and remove the food cup.
9) Reopening of the lid causes the controller to reset and be ready for a possible next food cup.

The food cup is available from the manufacturer in a variety of sizes and with a variety of food ingredients. The food ingredients may be formulated according to pet age or dietary needs. The food amount and cup size may be according to a range of pet ages or weights. The foods may be freeze dried meats or vegetables, or may be composites.

A possible accessory is anticipated in the form of a re-usable food cup having a removable cover with holes alignable with the spouts and special UPC code and into which a user may place their pet's favorite off-the-shelf pet food. The smart phone app could allow the user to program special preparation instructions for that food according to their pet's liking for automatic execution when that special UPC code is scanned.

It is also anticipated that either or both of the check valve/pump pairs before the chambers could be integrated together into a single fluid transfer device.

In an alternate fourth embodiment (not shown) the water tank could be disposed atop the appliance with the food cup disposed lower, generally similar to the second embodiment of FIGS. 10-17, and water from the tank could be fed to the heating chamber, steam chamber, and ultimately to the spouts through gravity . . . thereby allowing replacement of the pumps of the third embodiment with just valves that selectively deny or allow flow under the influence of gravity.

And it is anticipated that the code may alternatively be a proprietary code rather than a standard UPC bar code.

While the forgoing provides exemplary embodiments are meant to demonstrate key aspects and advantages of the invention, it should be understood that the invention is not meant to be limited thereto. The invention should be limited only by the following claims, including all equivalents thereto.

We claim:

1. An apparatus engageable with a container of pet food for preparing the pet food and comprising;
   a steam generation chamber;
   a heater;
   a scanner configured to read only a UPC Bar Code on the container;
   a programmed database disposed remotely or within the apparatus:
   a conduit for liquid communication from the steam generation chamber to the container;

a fluid transfer device in fluid communication with the steam generation chamber; and a controller connected by circuitry to the heater, scanner, and fluid transfer device;

wherein the scanner is adapted to communicate the read UPC Bar Code to the controller;

the controller is adapted to obtain or determine from the read UPC Bar Code, and from consultation with the programmed database, a steam volume and a steeping time;

the fluid transfer device is adapted to selectively enable or deliver a volume of water to the steam generation chamber;

the heater is adapted to heat the volume of water in the steam generation chamber into steam;

the conduit is adapted to selectively deliver the determined steam volume from the steam generation chamber to the container;

the controller is adapted to control the heater and the fluid transfer device; and the controller is adapted to do one or both of disable the apparatus and cause indication that the food is prepared at the end of the determined steeping time; and wherein the UPC Bar Code is one from a group of authorized codes contained within the programmed database, and the controller is adapted through information or instructions obtained by the consultation with the programmed database, to disable one or more of the heater and the fluid transfer device upon failure of the scanner to read an authorized code from the database on the container, and a base comprises the scanner, wherein the base adapted to support an unheated removable water tank; and wherein the container and the UPC Bar Code is located inside the unheated removable water tank.

2. The apparatus of claim 1 wherein the controller is adapted to obtain the steam volume and the steeping time wirelessly from an external database.

3. The apparatus of claim 2 further comprising a piercer adapted for piercing the container and the steam volume is delivered to the container through the piercer.

4. The apparatus of claim 3 wherein a lid movable relative thereto from a closed state wherein the container is not removed from the base and an open state wherein the container is removed from the base.

5. The apparatus of claim 4 further comprising a latch to selectively lock the lid in the closed state.

6. The apparatus of claim 4 wherein the lid comprises the piercer and movement of the lid from the open state to the closed state causes the piercer to pierce the container.

7. The apparatus of claim 6 wherein the conduit also comprises the piercer.

8. An apparatus engageable with a container of pet food for preparing the pet food and comprising:

a steam generation chamber;

a first fluid transfer device in liquid communication with the steam generation chamber;

a first heater in thermal communication with the steam generation chamber;

a first conduit for liquid communication from the steam generation chamber to the container;

a water heating chamber;

a second fluid transfer device in liquid communication with the water heating chamber;

a second heater in thermal communication with the water heating chamber;

a third fluid transfer device in liquid communication with the water heating chamber;

a second conduit for liquid communication from the heating chamber through the third fluid transfer device to the container;

a scanner configured to read only a UPC Bar Code on the container;

a programmed database disposed remotely or within the apparatus;

a controller; and a thermostat; wherein the scanner is adapted to communicate the read UPC Bar Code, and from consultation with the programmed database, to the controller;

the controller is adapted to obtain or determine from the read UPC Bar Code a steam volume, a hot water temperature, a hot water volume, a steeping time, and a resting time; the first fluid transfer device is adapted to selectively enable or deliver a first volume of water into the steam generation chamber;

the first heater is adapted to heat the first volume of water in the steam generation chamber into steam of the determined steam volume;

the first conduit is adapted to selectively deliver the determined steam volume from the steam generation chamber to the container;

the second fluid transfer device is adapted to selectively enable or deliver a second volume of water into the heating chamber;

the second heater is adapted to heat the second volume of water in the heating chamber to the determined hot water temperature;

the third fluid transfer device is adapted to selectively enable or deliver the determined hot water volume from the heating chamber through the second conduit to the container;

the controller is adapted to control the first and second heaters and the first, second, and third fluid transfer devices; and the controller is adapted to do one or both of disable the apparatus and cause indication that the food is prepared at the end of the determined resting time; and wherein the UPC Bar Code is one from a group of authorized codes, and the controller is adapted, through information or instructions obtained by the consultation with the programmed database, to disable one or more of the heaters and the fluid transfer devices upon failure of the scanner to read an authorized code from the database on the container, and a base comprises the scanner, wherein the base adapted to support an unheated removable water tank; and wherein the container and the UPC Bar Code is located inside the unheated removable water tank.

9. The apparatus of claim 8 wherein the controller is adapted to obtain the steam volume, hot water temperature, hot water volume, steeping time, and resting time wirelessly from an external database.

10. The apparatus of claim 9 wherein further comprise first and second piercers adapted for piercing the container and the steam and hot water volumes are delivered to the container through their associated piercer.

11. The apparatus of claim 10 wherein a lid movable relative thereto from a closed state wherein the container is not removed from the base and an open state wherein the container is removed from the base.

12. The apparatus of claim 11 further comprising a latch to selectively lock the lid in the closed state.

13. The apparatus of claim 11 wherein the lid comprises the piercers and movement of the lid from the open state to the closed state causes the piercers to pierce the container.

14. The apparatus of claim 13 wherein the conduits also comprise the associated piercers.

\* \* \* \* \*